United States Patent [19]

Siwecki

[11] Patent Number: 4,974,213

[45] Date of Patent: Nov. 27, 1990

[54] PASSIVE ACTIVE UNDERWATER SOUND DETECTION APPARATUS

[76] Inventor: Thomas L. Siwecki, 2200 Hidden Oak Dr., Danville, Calif. 94526-2026

[21] Appl. No.: 326,508

[22] Filed: Mar. 20, 1989

Related U.S. Application Data

[63] Continuation-in-part of Ser. No. 285,810, Dec. 16, 1988, abandoned.

[51] Int. Cl.$^5$ .............................................. G01S 15/00
[52] U.S. Cl. ..................................... 367/88; 367/153; 181/110
[58] Field of Search ................................. 367/103–107, 367/120–124, 127, 129, 130, 56–58, 88, 92, 3, 21, 23; 181/111, 112, 110

[56] References Cited

U.S. PATENT DOCUMENTS

| | | | |
|---|---|---|---|
| 3,089,118 | 5/1963 | Baumann | 340/6 |
| 3,113,286 | 12/1963 | Miller et al. | 340/6 |
| 3,268,856 | 8/1966 | Wallen | 340/15 |
| 3,277,433 | 10/1966 | Toulis | 340/8 |
| 3,375,488 | 3/1968 | Bridges et al. | 340/8 |
| 3,490,024 | 1/1970 | Sherrill et al. | 343/113 |
| 3,792,423 | 2/1974 | Becker et al. | 340/5 MP |
| 3,858,165 | 12/1974 | Pegg | 340/3 R |
| 3,964,014 | 6/1976 | Tehon | 367/129 |
| 4,003,015 | 1/1977 | Pipkin | 340/3 R |
| 4,112,411 | 9/1978 | Alais et al. | 340/1 R |
| 4,210,905 | 7/1980 | Renzel et al. | 340/347 AD |
| 4,281,551 | 8/1981 | Gaudriot et al. | 73/647 |
| 4,397,008 | 8/1983 | Ziese | 367/113 |
| 4,480,322 | 10/1984 | Orieux et al. | 367/123 |
| 4,661,938 | 4/1987 | Jones et al. | 367/153 |
| 4,694,434 | 9/1987 | von Ramm | 367/7 |
| 4,872,144 | 10/1989 | Young et al. | 367/57 |

OTHER PUBLICATIONS

Strategic Antisubmarine Warfare and Naval Strategy, Tom Stefanick, 1987, Institute for Defense and Disarmament Studies.

Sonar Signal Processing, George Wash. Univ. Course #475, W. R. Hahn and Edgar H. Neal, Class Notes (circa 1979).

Primary Examiner—Brian S. Steinberger
Attorney, Agent, or Firm—Robert R. Tipton

[57] ABSTRACT

A three-dimensional large scale rectilinear array of hydrophones comprising a plurality of equally spaced, fixed position, omni-directional, electro-acoustic transducers, utilizes aperture steering circuits to create a polar coordinate map indicating the bearing and elevation of incoming sound signals. The attitude and depth of the array is controlled by an array maneuvering system to position the array for maximum signal strength and to rotate the array to a horizontal position for maneuvering in shallow water. The geometric configuration combined with digital signal processing circuits provide improved sound detection threshold over linear and single planar arrays. An acoustically transparent housing is used to enclose the array. The shape of the housing and supporting structural frame are adapted to limit self-induced background noise.

The hydrophones are also alternately connected to circuits for activating the hydrophone array to produce a low frequency (100 to 1000 Hz) frequency sound pulse defining a beam having a predetermined vertical and horizontal solid angle and predetermined bearing and azimuth.

23 Claims, 15 Drawing Sheets

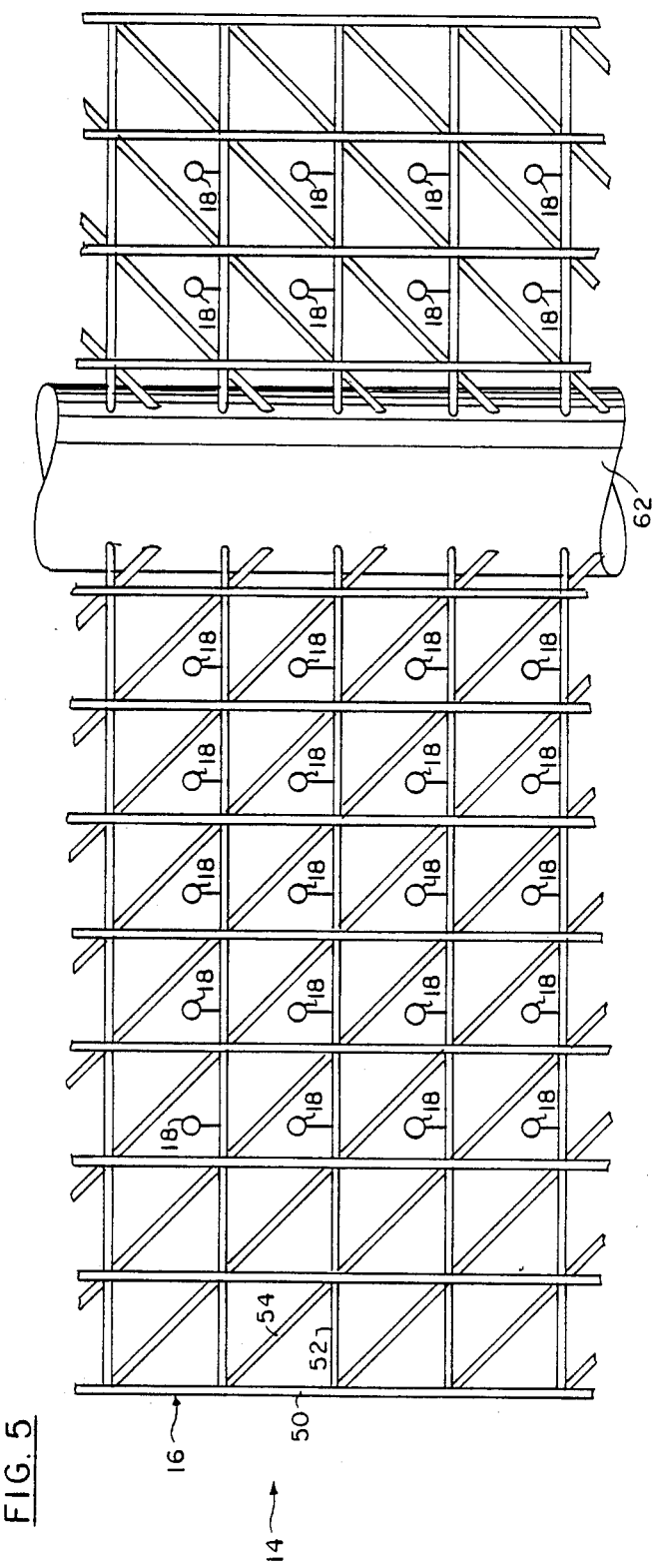
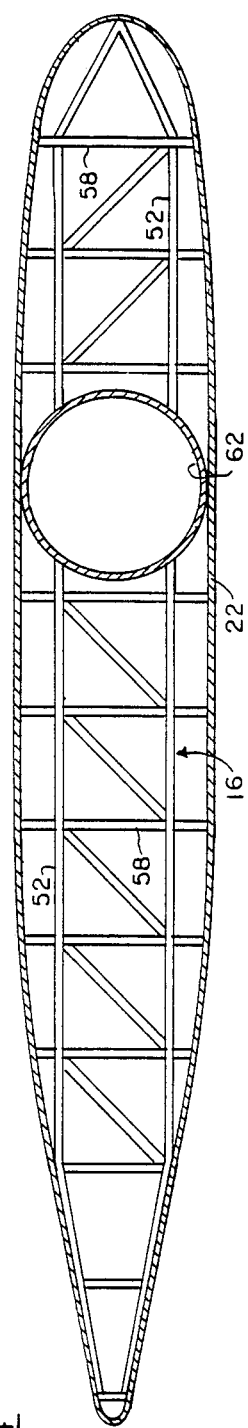
FIG. 5
FIG. 4

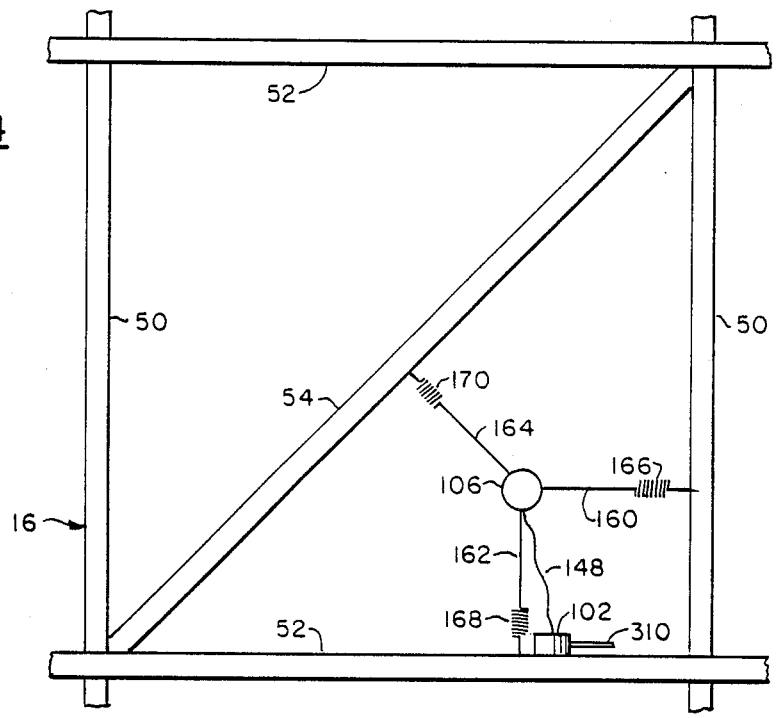
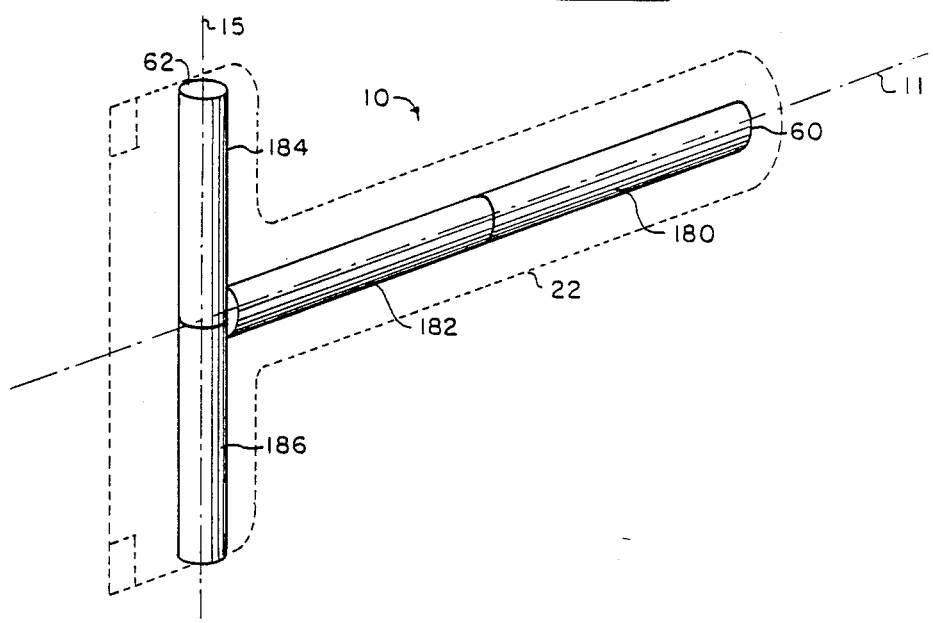

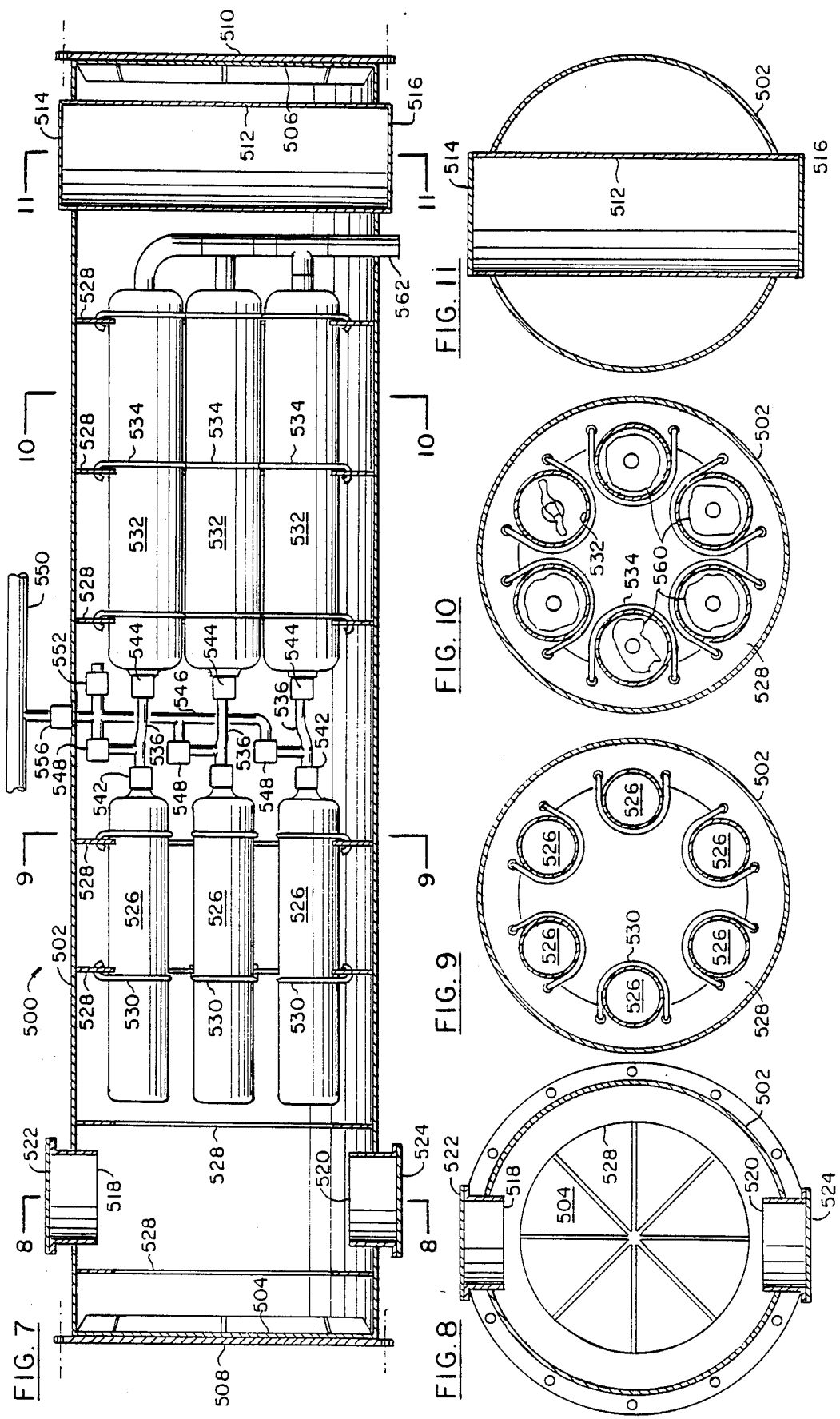

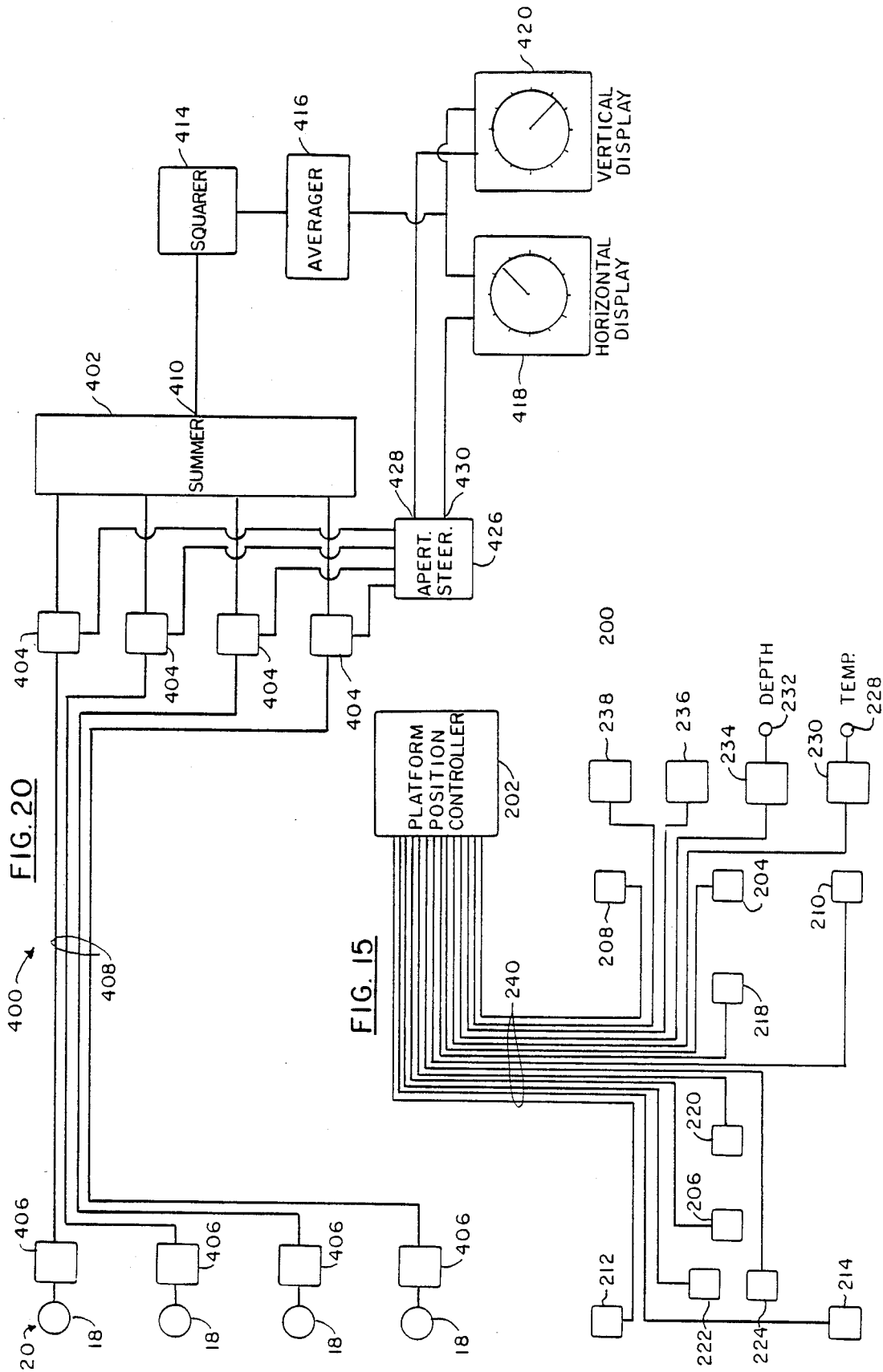

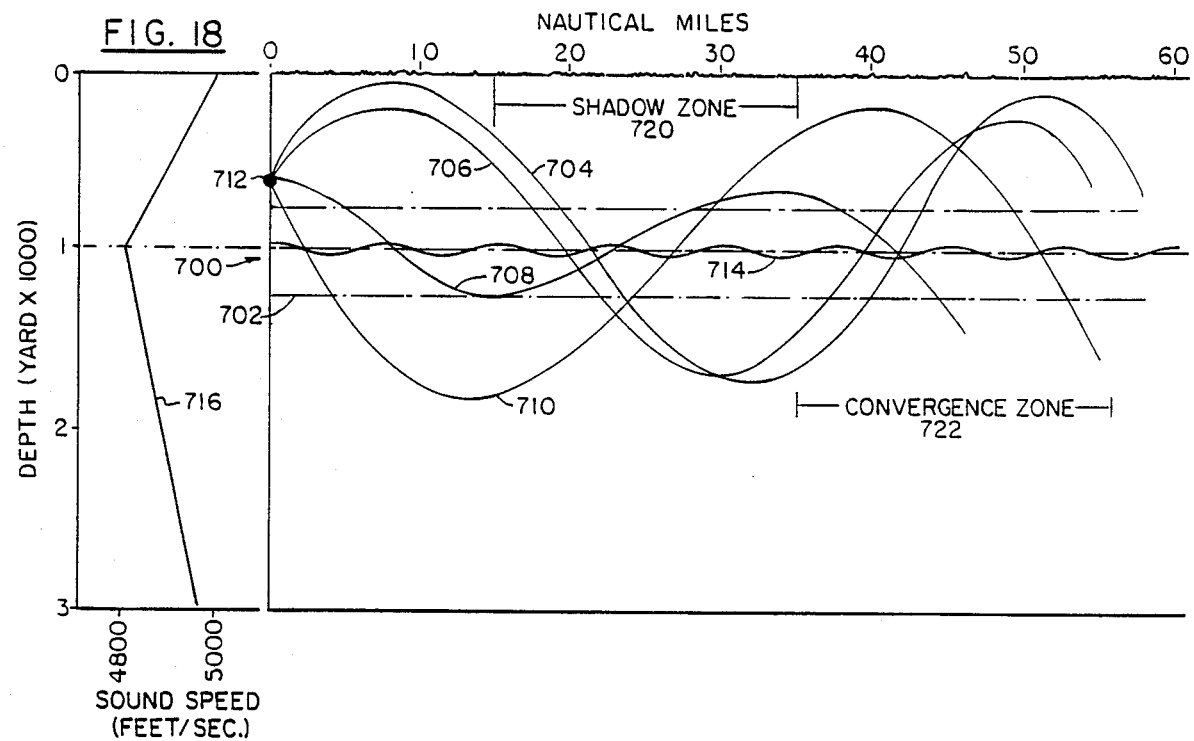
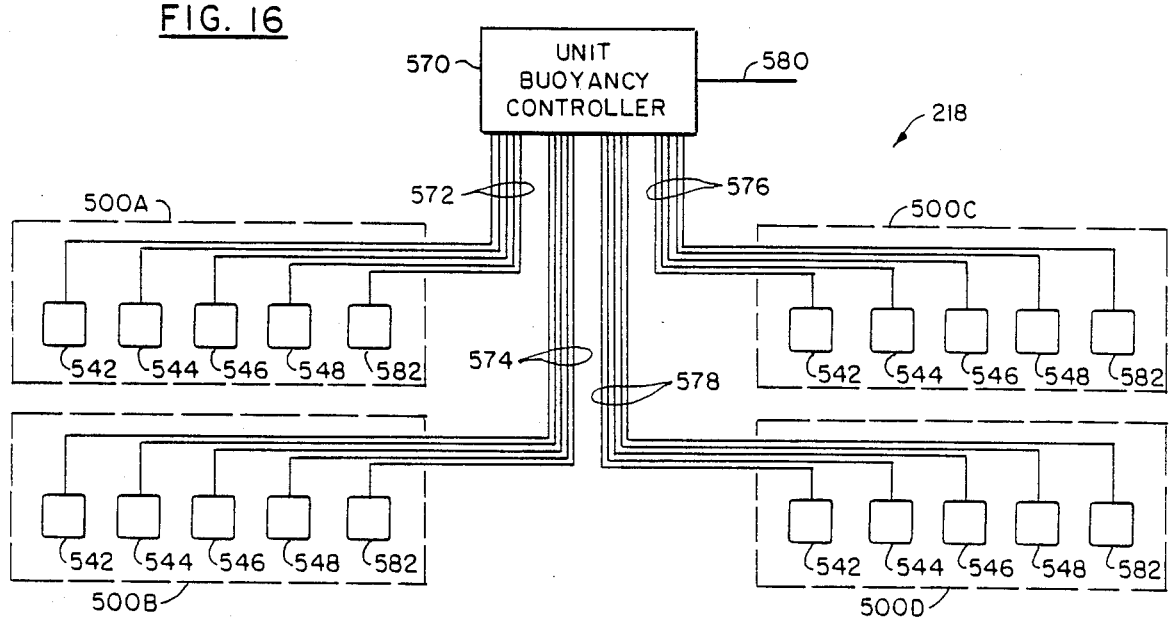

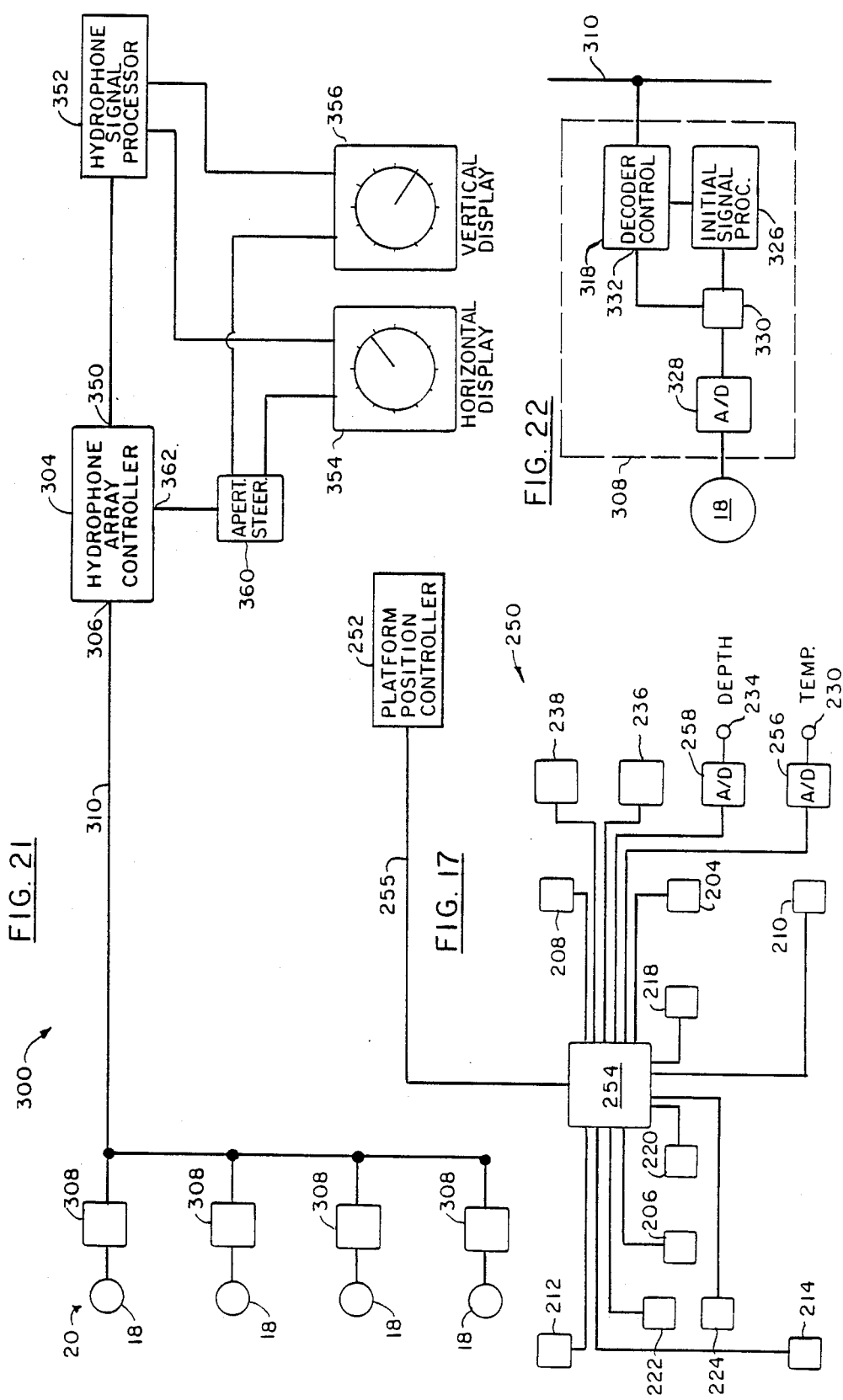

PASSIVE ACTIVE UNDERWATER SOUND DETECTION APPARATUS

This application is a continuation-in-part of application Ser. No. 07/285,810, filed on Dec. 16, 1988, now abandoned.

BACKGROUND OF THE PRIOR ART

This invention relates generally to devices for detecting sound pressure waves in water and, in particular, to large scale passive sonar arrays capable of detecting weak sound waves.

To detect weak coherent sound signals in an ocean environment, a sound detecting apparatus must overcome many obstacles a few of which are ambient noise, attenuation of sound as a function of frequency and array gain.

Ambient noise in the ocean comes from many sources including biological noise such as whales and other underwater animals, miscellaneous ship noises such as gear and propeller noises, wind generated wave noise, and storm generated (rain) noise.

This ambient noise level tends to mask the noise from a particular sound source.

For long range (over 50 miles) sonar detection of a man-made sound signal in an ocean environment, almost 100% of the sound propagating in the vertical direction is ambient noise while 90-100% of the sound propagating in the horizontal direction is man-made sound signal. In other words, the main long range signal path of man-made sound in an ocean environment is in a generally horizontal plane.

Long range sound propagation in the ocean depends upon many factors such as sound frequency, ocean depth, salinity water temperature, surface waves and nature of underwater terrain.

In deep water, in temperate latitudes where there is a temperature gradient from warm surface water to deeper colder water, sound velocity will gradually decrease with depth up to a particular depth below which sound will gradually increase in velocity due to steady increase in water pressure. In the region where sound velocity reaches a minimum, underwater sound signals will be refracted back and forth across this region and can travel great distances. Depending upon the temperature gradient of the water, latitude and season, this minimum sound velocity region, defining generally horizontal plane or "sound channel", can vary in depth from 0 to 3,000 feet.

Where the sound source is located on the surface of the water or below the surface but above the sound channel, this phenomenon can produce what are known as "shadow zones" in the region above the sound channel measuring 20 to 50 miles in width where the sound intensity of the source will be very weak or non-existent. Between these shadow zones are "convergence zones" where the sound signals tend to concentrate and are more readily detected.

To avoid these shadow zones, sonar detectors should be placed at or near the convergence zone or submerged to the sound channel depth. Few prior art sonar devices used apparatus for controlling the depth of a towed detector. Most prior art sonar devices were either placed or towed on the surface or in upper several 100 feet of the ocean or placed on the ocean floor.

In relatively shallow water, that is, water shallower than the depth of the sound channel, the sound pressure wave can propagate over relatively long distances by multiple reflections from the water surface and ocean bottom. In this situation the ocean acts in the manner of a waveguide permitting long wavelength sound waves to be attenuated less than shorter wave length sound waves.

In the process of being reflected, the sound wave is further distorted and modified depending upon the size and period of surface waves and the topography of the ocean bottom.

Propagation of sound in the ocean is also very frequency dependent. For frequencies below approximately 100 Hz, sound energy is attenuated, for the most part, by losses due to reflection from the ocean surface and bottom. This would be represented by an absorption coefficient of about 0.001 to 0.003 dB per kiloyard.

For frequencies ranging from 100 Hz to about 10 KHz, sound energy is attenuated primarily by $B(OH)_3$ in the water. This would be represented by an absorption coefficient of about 0.001 to 1.0 dB per kiloyard. Above 10 KHz sound energy is principally attenuated by $MgSO_4$. This would be represented by an absorption coefficient of about 1.0 dB per kiloyard at 10 KHz to 200 dB per kiloyard at about 500 KHz.

Thus, the transmission losses for an unknown sound source will be lowest for frequencies of about 1,000 Hz and below. This would be represented by an absorption coefficient of about 0.10 dB per kiloyard down to about 0.001 dB per kiloyard or less.

Because most man-made sounds in the ocean fall below 2,000 Hz, the frequency range of most underwater sound detectors or hydrophones fall between 600 Hz and 2,000 Hz with the most used range being 600 Hz to 1,200 Hz.

Since ambient noise and sound propagation in the ocean are an uncontrollable parameters, the sonar devices of the prior art have all attempted to increase array gain by various techniques including increasing the length or size of a linear array of hydrophones, design circuits that analyze the incoming signal by frequency domain techniques using Fourier analysis, or use electronic circuits to discriminate the direction of the incoming signal by various beam, aperture or receiving lobe forming techniques.

Nearly all of the prior art signal processing circuits used analog circuits and methods to increase the signal-to-noise ratio based on the RMS value of the hydrophone output signal.

Although increasing the number of hydrophones will increase hydrophone array signal-to-noise ratio, there is, however, a practical limit as to how many hydrophones can h=used both as to cost and ability of the electronic circuits to control beam direction and signal processing.

Since control of beam or aperture lobe direction for receiving an incoming signal is important for increasing the signal-to-noise ratio, most prior art sonar arrays have used this technique.

The primary technique for discriminating signal direction is to measure the time delay of the pressure wave between hydrophones. Most of these circuits measure such time delay in real time, as opposed to initially storing the time delay data for later processing.

For sound pressure waves arriving perpendicular, 90 degrees, to the array, there will be no time delay detected between hydrophones for a linear array.

For sound pressure waves arriving at an angle between 0 and 90 degrees or between 90 and 180 degrees to the array, there will be a measurable time delay between adjacent hydrophones, the maximum delay being at 0 and 180 degrees.

One prior art apparatus utilized a towed linear array of equally spaced hydrophones several thousand feet long in order to increase array gain according to the theory that array gain is equal to 10 times the log of the number of hydrophones used.

This array was generally towed behind a ship. In some cases the linear array was provided with a means for controlling its depth but not necessarily its horizontal attitude.

The problem with a linear array is its flexibility and inability to always deploy into a straight line, particularly when the towing vessel makes a turning maneuver.

If a time delay method of determining signal direction is used, the ability to discriminate direction is substantially reduced while the array is in the curved condition.

Since the ability to discriminate direction greatly increases the signal-to-noise ratio of the array, such a maneuver substantially reduces the effectiveness of such a linear configuration.

In addition, for such a linear array, there is an ambiguity as to which side of the array the signal is coming from. The pressure wave front arriving from a sound source 45 degrees to the right in front of the array will produce a received signal identical to a sound source 45 degrees to the left in front of the array.

The only way for such a linear array to discriminate as to which side the signal is coming from is to use individual hydrophones sensitive to sound pressure waves only in one hemisphere.

Furthermore, many of the prior art sonar array systems are adapted to simultaneously receive signals propagating along the vertical as well as the horizontal direction. Because of the very high noise level in the vertical direction produced during a storm by the rain striking the surface of the water, sonar systems adapted to detect sound waves without distinguishing between vertical and horizontal direction are virtually useless during even a light rain storm at sea.

Because a vertically disposed linear array of hydrophones cannot be towed horizontally and maintain its linearity, such an array configuration would not be practical as a mobile sonar listening platform.

SUMMARY OF THE INVENTION

The three dimensional passive sonar array of the present invention provides significant array gain and beam or aperture lobe directivity by comprising a single rectilinear, 3-dimensional matrix of hydrophones fixed in their location relative to each other or by a first plurality of omni-directional electro-acoustic transducers arranged in an ordered array defining an generally elongated plane, further plurality of omni-directional electro-acoustic transducers arranged in a fixed position relative to each other in an ordered array defining a generally elongated plane disposed parallel to and spaced apart from the first plurality of omni-directional electro-acoustic transducers, the parallel arrays defining a three-dimensional, rectilinear matrix of equally spaced omni-directional electro-acoustic transducers. Means are provided for detecting the direction of an incoming signal by rotating the beam or aperture lobe 360 degrees in the horizontal plane and 360 degrees in the vertical plane. Further means are provided for analyzing the incoming signal as to coherence and sound intensity as a function of frequency as well as discriminating between horizontal and vertical incoming sound signals.

In addition, means are provided for controlling the depth and attitude of the sonar array to provide a minimum of self-induced noise due to turbulence.

It is, therefore, an object of the present invention to provide a passive underwater sound detection apparatus having a high signal-to-noise ratio.

It is another object of the present invention to provide a passive underwater sound detection apparatus that separately measures both horizontally as well as vertically propagating sound waves.

It is a further object of the present invention to provide a passive underwater detection apparatus having 360 degree, spherical directivity detecting capability.

It is a another object of the present invention to provide a passive underwater detection apparatus capable of measuring pressure wave coherence.

It is yet a further object of the present invention to provide a passive underwater detection apparatus utilizing a three-dimensional, rectilinear matrix of electro-acoustic transducers in which the electro-acoustic transducers are fixed in position relative to each other.

It is still another object of the present invention to provide a generally planar passive underwater detection apparatus adapted to be rotated in the water from a horizontal to a vertical position.

It is another object of the present invention to provide a generally planar passive underwater detection apparatus utilizing a system for controlling the depth and attitude of the apparatus.

It is a further object of the present invention to provide a passive underwater detection apparatus in which sound pressure waves in a generally horizontal plane can be distinguished from sound pressure wave in a generally vertical plane.

It is yet another object of the present invention to provide a passive underwater detection apparatus adapted to be towed through the water with a minimum of drag and turbulence.

These and other objects of the present invention will become manifest upon study of the following detailed description when taken together with the drawings.

BRIEF DESCRIPTION OF THE DRAWINGS

FIG. 4 is an elevational cross-section of the underwater sound detection apparatus of FIG. 1 taken at lines 4—4 of the main vertical section.

FIG. 5 is a side elevational view of the underwater sound detection apparatus of FIG. 1 showing a portion of the main vertical section of the support structure with the outer housing removed.

FIG. 6 is an isometric view of the flotation system for the passive underwater sound detection apparatus of the present invention.

FIG. 7 is a sectional, side elevational view of a typical buoyancy member showing the arrangement of the buoyancy control equipment therein.

FIG. 8 is a cross section of a typical buoyancy member of Figure taken at line 8—8.

FIG. 9 is a cross section of a typical buoyancy member of Figure taken at line 9—9.

FIG. 10 is a cross section of a typical buoyancy member of Figure taken at line 10—10.

FIG. 11 is a cross section of a typical buoyancy member of Figure taken at line 11—11.

FIG. 14 is an illustration of a further method of mounting the hydrophone or electro acoustic transducer to the support platform.

FIG. 15 is a schematic diagram of as typical platform position control system using analog control circuits.

FIG. 16 is a schematic diagram of a typical unit buoyancy control system for the buoyancy members shown in FIG. 6.

FIG. 17, is a schematic diagram of as typical platform position control system using digital control circuits.

FIG. 18 is a cross-sectional view of the ocean showing a typical sound channel and the diffraction of sound waves in an ocean environment.

FIG. 20 is a schematic circuit diagram for an analog hydrophone control and signal processing system.

FIG. 21 is a schematic diagram of a digital hydrophone control and signal processing system.

FIG. 22 is a schematic diagram of an individual hydrophone controller system.

DESCRIPTION OF THE PREFERRED EMBODIMENT

Figure 1:
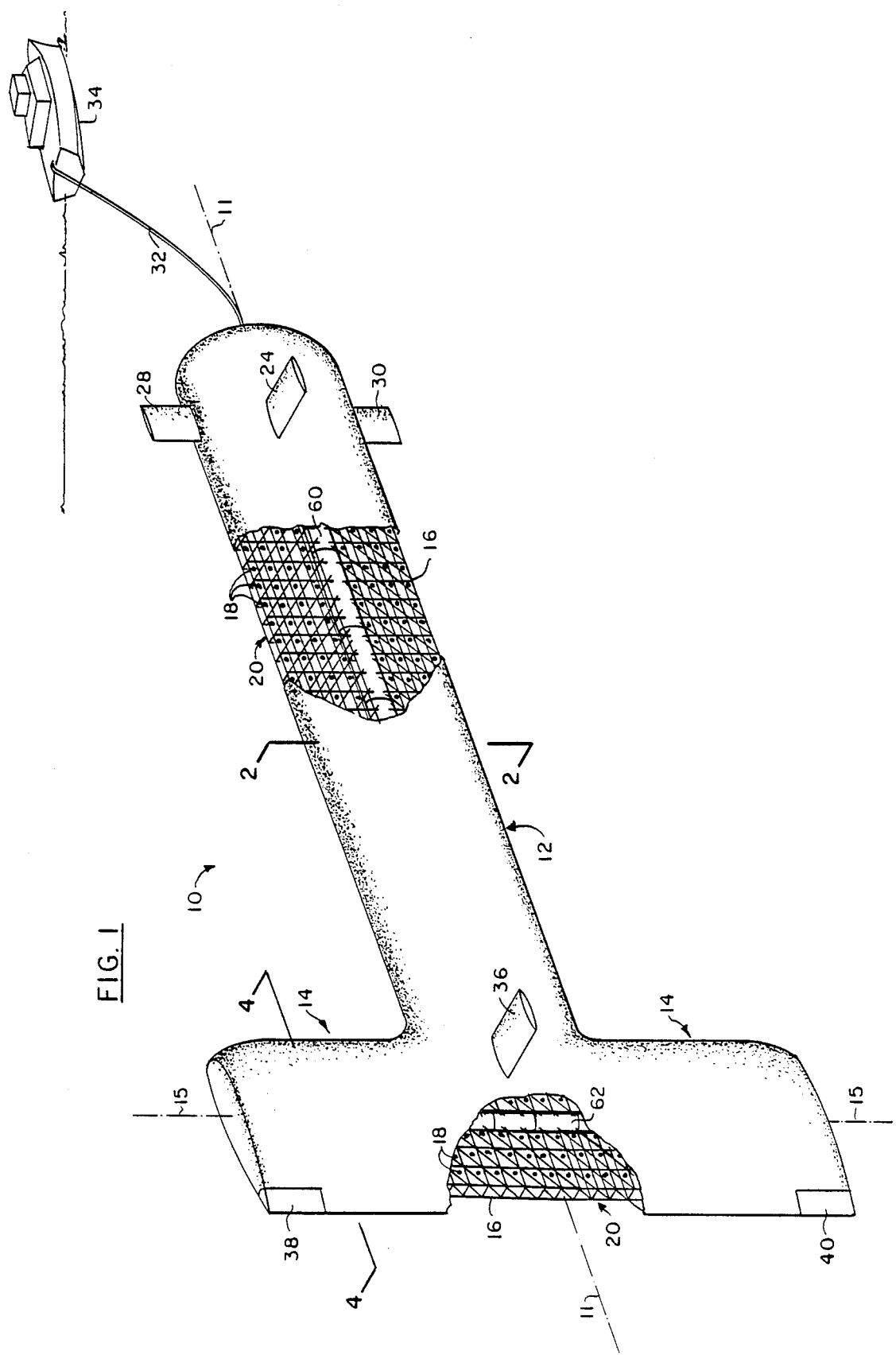
FIG. 1 is an isometric view of the underwater sound detection apparatus of the present invention.

With reference to FIG. 1 there is illustrated an isometric view of the passive underwater sound detection apparatus 10 of the present invention shown being towed through the water in its vertical sound detecting position.

Passive underwater sound detection apparatus 10 comprises, basically, a structural framework hydrophone support platform 16 on which are mounted a plurality of hydrophones 18 arranged a rectilinear, generally "T" shaped, three dimensional array or matrix 20 enclosed is a thin shell skin or housing 22 having a low mass, such as, fiberglass plastic, aluminum or the like, so that sound pressure waves will pass through the housing with a minimum of attenuation. For convenience, such a housing will be referred to herein as being generally "acoustically transparent".

Because housing 22 is really only a thin shell, it must be understood that the water contained within shell 22 must be in fluid communication with the water outside so that the pressures are equalized. Thus, holes or conduits (not shown) must be provided along the edges of shell or housing 22 to allow such pressure equalization with proper precautions taken to avoid sound generation. Since water is contained both inside and outside of housing 22, sound waves will be able to pass through housing 22.

"T" shaped, three-dimensional array 20 comprises a main horizontal member 12 defining the stem of the "T" with the main vertical member 14 defining the top of the "T".

Main horizontal member 12 comprises a pair of generally parallel arrays of omni-directional electro-acoustic transducers 18, fixed in position relative to each other, defining a generally elongated shape having a longitudinal axis of rotation 11.

Main vertical member 14 comprises a pair of generally parallel arrays of omni-directional electro-acoustic transducers 18, fixed in position relative to each other, defining a generally elongated shape having a vertically disposed longitudinal axis 15, the planes of each array of vertical member 14 being disposed in the same plane as the arrays of horizontal member 12.

A pair of bow planes 24 are provided on each side of housing 22 proximate the bow of sound detection apparatus 10. A tow cable 32 is connected proximate the bow of housing 22 for towing by surface ship 34.

Attached to tow cable 32 are an air supply conduit and the various multi-conductor control and power cables used to maneuver array 20 and transmit sonar signals to the processing apparatus located in towing vessel or surface ship 34.

A pair of stern planes 36 are provided on each side of housing 22 proximate the stern of sound detection apparatus 10.

Bow and stern planes 36 and 24 are used both to maneuver array 20 to the depth at which array 20 is to be listening for sonar signals as well as maneuver the longitudinal axis 11 of the main horizontal member 12 to a horizontal position until the buoyancy control system takes over.

In addition, an upper rudder 38 and a lower rudder 40 are, respectively, provided proximate the upper and lower ends of main vertical member 14 for the purpose of steering array 20 as well as rotating array 20 about its longitudinal axis.

Figure 3:
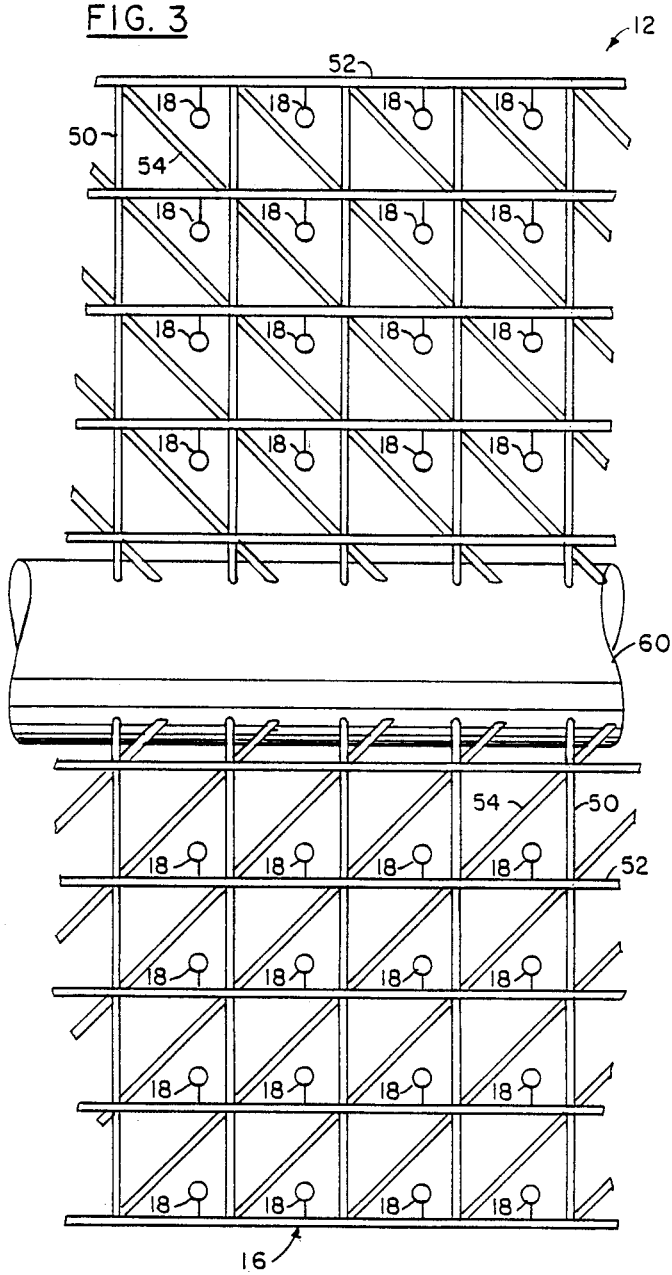
FIG. 3 is a side elevational view of the underwater sound detection apparatus of FIG. 1 showing a portion of the main horizontal section of the support structure with the outer housing removed.
Figure 2:
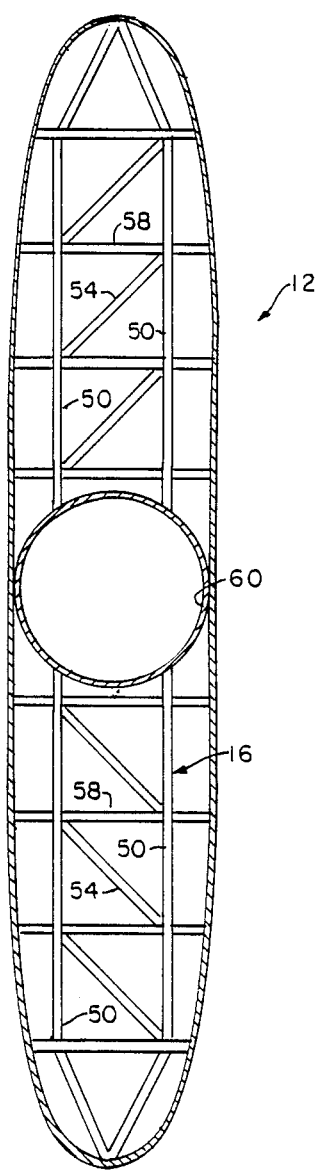
FIG. 2 is an elevational cross section of the underwater sound detection apparatus of FIG. 1 taken at lines 2—2 of the main horizontal section.

Platform Structure:

With reference to FIGS. 2 and 3, there is respectively shown an elevational cross-section of main horizontal member 12 of support platform 16 taken at lines 2—2 of FIG. 1 and a side elevational view of support platform 16 with housing or acoustically transparent skin 22 removed.

Platform skeleton or support structure 16 is a generally rigid structural framework truss comprising vertical support members 50 attached to horizontal support members 52 with cross-brace structural members 54 and lateral structural members 58 attached to the point of connection of vertical support members 50 to horizontal support members 52. Platform skeleton or support structure 16 thus defines a three-dimensional, generally rigid, lattice on which are mounted hydrophones 18 so that they will be located in a known fixed relationship to each other.

Acoustically transparent housing or skin 22 is attached to platform skeleton or support structure 16 proximate the ends of lateral support members 58. The length of lateral support member 58 will vary in order to achieve a somewhat streamlined surface to housing 22 in order to reduce drag when towing array 20 through the water.

Main horizontal section 12 further comprises a flotation member 60 adapted to form the backbone or central core of horizontal member 12.

Flotation member 60 is adapted to provide the needed positive buoyancy necessary for maneuvering platform skeleton or support structure 16 on the surface of the water as well as permit bow and stern planes 24 and 36 to control the depth and trim of support structure 16 when in the vertical or operating position.

With reference to FIGS. 4 and 5, there is respectively shown an horizontal cross-section of main vertical member 14 of platform skeleton or support structure 16 taken at lines 4—4 of FIG. 1 an da side elevational view of platform skeleton or support structure 16 with housing or acoustically transparent skin 22 removed.

Platform skeleton or support structure 16 of vertical member 14 is identical to that of horizontal member 12. It defines a generally rigid structural framework comprising vertical support members 50 attached to horizontal support members 52 with cross-brace structural members 54 and lateral support members 58 attached to the point of connection of vertical support members 50 to horizontal support members 52. Platform skeleton or support structure 16 thus defines a three-dimensional, generally rigid, lattice on which are mounted hydrophones 18 so that they will be located in a known fixed relationship to each other.

Acoustically transparent housing or skin 22 is attached to platform skeleton or support structure 16 proximate the ends of lateral support members 58. The length of lateral support member 58 will vary in order to achieve a somewhat streamlined hydrodynamic surface to housing 22 in order to reduce drag when towing array 20 through the water.

Main vertical section 14 further comprises a vertically disposed flotation member 62 adapted to form the backbone or central core of vertical member 14.

Flotation member 62, similar to its counterpart flotation member 60, is adapted to provide the necessary positive buoyancy for maneuvering platform skeleton or support structure 16 on the surface of the water as well as provide the balance necessary for rudders 38 and 40 to be in a neutral position to reduce turbulence while support structure 16 is maintained in a vertical position when sound signals are being detected.

Flotation System:

With reference to FIG. 6 there is illustrated a schematic diagram of the flotation system for the passive underwater sound detection apparatus 10 of the present invention. Housing 22 of sound detection apparatus 10 is shown in dashed line.

The flotation system comprises, basically, main horizontal buoyancy member 60 and main vertical buoyancy member 62.

Main horizontal buoyancy member 60 comprises forward portion 180 and a stern portion 182.

Main vertical buoyancy member 62 comprises an upper portion 184 and a lower portion 186.

Both main horizontal buoyancy member 60 (including forward portion 180 and stern portion 182) and main vertical buoyancy member 62 (including upper portion 184 and lower portion 186) comprise modular sections containing compress air tanks and bladder type accumulators. A typical modular section 500 is illustrated in FIG. 7 and cross section FIGS. 8, 9, 10 and 11.

Modular section 500 comprises, basically, a main cylindrical body section 502 closed at each end by a pair of end caps 504 and 506. A pair of flange members 508 and 510 are provided about the periphery of each end of main cylindrical body member 502 for the purpose of attach other body sections together to form buoyancy members 60 and 62.

A ballast tube 512, adapted to contain lead shot, is placed inside cylindrical body member 502 in a vertical position perpendicular to its longitudinal axis of rotation. A pair of blow-off covers 514 and 516 are attached at the top and bottom opening of ballast tube 512 to provide release of the ballast in the event of an emergency. Covers 514 and 516 can be "blown off" by means of compressed air or exploding bolts well known in the art.

Proximate the opposite end cylindrical body member 502 are top and bottom manhole openings 518 and 520, respectively, sealed by air-tight covers 522 and 524, respectively.

Enclosed within main cylindrical body member 502 are a number of compress air cylinders 526 mounted on reinforcing rings 528 attached to the inside of main cylindrical body member 502 by retainer straps or members 530.

A number of reinforcing rings 528 air attached to the inside surface along the length of main cylindrical member 502, as by welding or the like, for the purpose of maintaining the shape of the vessel while subjected to underwater pressures.

Also enclosed within main cylindrical member 502 are a number of bladder type accumulators 532 that are also mounted on reinforcing rings 528, in cylindrical body member 502, using retainer straps or members 534.

An air conduit 536 within main cylindrical member 502 is used to connect each bladder accumulator 530 to a corresponding compressed air cylinder 526 through compressed air solenoid valve 542 and bladder accumulator solenoid valve 544.

An additional main supply air conduit 546 is used to provide compressed air to air conduit 536 through main supply air solenoid valve 548.

Main supply air conduit 546 is in fluid communication with main air supply hose or conduit 550 connected to and receiving its air from an air compressor (not shown) in towing vessel 34.

Air pressure within main cylindrical body member 502, used to counteract outside water pressure, is supplied through main cylindrical body member solenoid valve 552 from air supply conduit 546.

With reference to FIG. 10, it will be noted that bladder accumulators 532 are provided with resilient bladders 560 which expand and contract according to the air supplied from main air supply conduit 546. The water forced in and out of bladders 532 is vented to the outside of main cylindrical member 502 through vent conduit 562 thus controlling the buoyancy of the unit.

Under normal operating conditions buoyancy is controlled by supplying compressed air from main compressed air supply conduit 550 to bladder accumulators 532 through compressed air solenoid valves 546 and bladder accumulator air supply solenoid valves 544.

Only in an emergency, such as, a break in main air supply conduit 550, will compressed air from compressed air cylinders 526 be used to provide displacement air to bladder accumulators 532.

Compressed air solenoid valves 542 and bladder accumulator valves 544 can be normally open valves when not energized to provide a fail safe condition. An emergency anti-backflow valve 556 is adapted to close in the event of a break in main air supply conduit 550.

Anti-backflow valve 556 should be of a type that will permit low volume air flow back through air supply conduit 550, but rapidly close when the flow of air exceeds a specified low volume rate.

In the event of a break in the main air supply conduit, blow-off covers 514 and 516 are also released by devices well known in the art, such as exploding bolts (not shown), to allow lead ballast (not shown) in ballast tube 512 to be jettisoned to further increase buoyancy of sound detection apparatus 10.

It must be understood that under normal sound detection operation, the attitude of sound detection apparatus 10 will be controlled solely by buoyancy. All control surfaces will be placed in a neutral position to reduce turbulence to a minimum.

By controlling the buoyancy of forward portion 180 and stern portion 182 of flotation member 60 the horizontal attitude of axis 11 can be controlled without the use of bow and stern planes 24 and 36, respectively.

By controlling the buoyancy of upper portion 184 and lower portion 186 of flotation member 62, the vertical attitude of axis 15 can be controlled without the use of upper rudder 38 or lower rudder 40.

Figure 12:
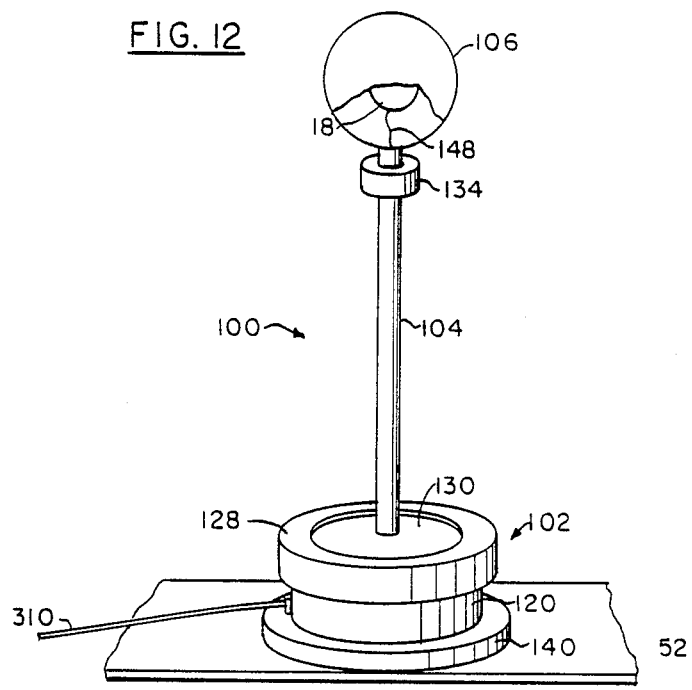
FIG. 12 is an isometric view of a typical hydrophone or electro-acoustic transducer vibration isolation and mounting support.

Hydrophone Mounting:

With reference to FIG. 12 there is illustrated an isometric view of a typical hydrophone vibration isolation support used to mount hydrophone 18 to platform framework or support structure 16.

Hydrophone support 100 comprises, basically, hydrophone vibration isolation base support 102 adapted to be attached to structural member 58 (or any of the other structural members of structure 16), with a stand-off tube 104 connected at its lower end to base support 102 and at its upper end to an acoustically transparent hydrophone housing 106 containing hydrophone 18.

Acoustically transparent hydrophone housing 106 can define a generally spherical shape within which hydrophone 18 can be mounted on additional vibration isolation members common in the art (not shown).

Figure 13:
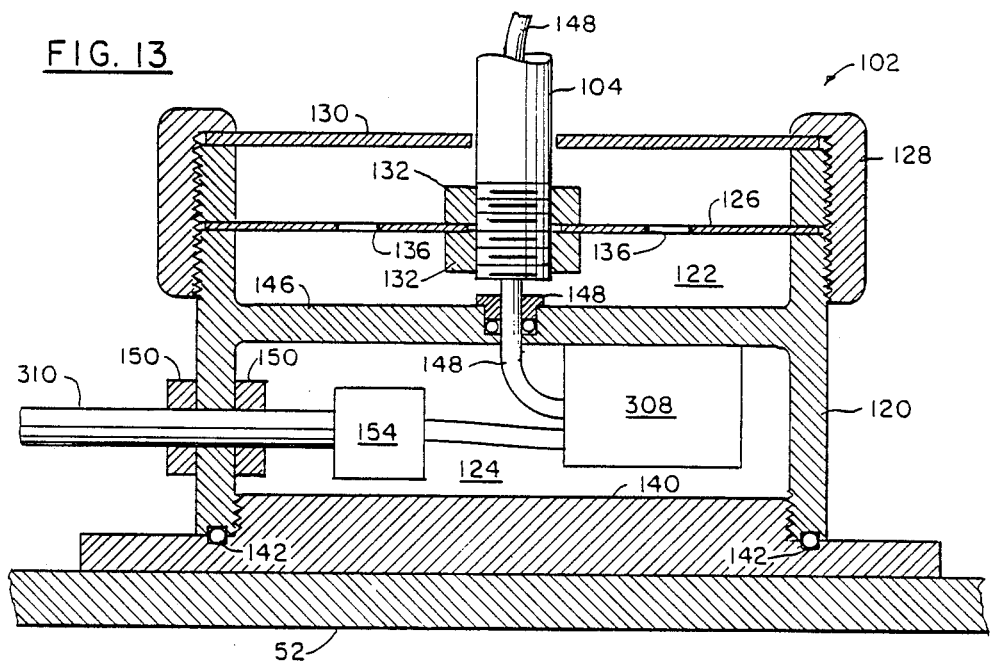
FIG. 13 is an elevational cross-section of the vibration isolation base support.

With reference to FIG. 13, there is illustrated an elevational cross-section of hydrophone vibration isolation base support 102.

Base support 102 comprise,, basically, a base support housing 120 defining an upper plenum 122 and a lower plenum 124.

Upper plenum 124 is capped by a generally resilient flexible diaphragm 126 maintained in position by base support retainer ring 128 which also maintains protective cover 130 in place over flexible diaphragm 126

Stand-off tube 104 is attached to the center of flexible diaphragm 126 by means of anchor nuts 132.

Flexible diaphragm 126 is designed to prevent horizontal as well as vertical vibrations of structural member 58 from being transmitted to stand-off 104. To further isolate lateral vibrations from hydrophone 18, a pendulum weight 134 (FIG. 12) is attached to stand-off tube 102 to increase its inertia and further prevent stand-off tube 102 and hydrophone housing 106 from moving both vertically and laterally due to vibrations of structural member 58.

Since upper plenum 122 will be filled with water, pressure relief holes 136 are provided in flexible diaphragm 126 to allow it to move vertically and also damp such movement.

Plenum 124 of base support housing is adapted to contain the various items of electronic hardware, such as, preamplifier 406, if an analog signal processing system is used (FIG. 20) or hydrophone controller 308, if a digital system is used (FIG. 21).

Lower plenum 124 is closed and sealed against water pressure using base mounting plate 140 in cooperation with O-ring pressure seal 142.

Pressure seal opening 144 is provided in central divider 146 to allow entry of electrical conductor cable 148, connected to hydrophone 18 and contained in stand-off tube 104, into lower plenum 124 for connection to preamplifier 406 (FIG. 20) or hydrophone controller 308 (FIG. 21).

Additional pressure seal opening 150 is provided in the side of housing 120 for entry of communication cable 310 into lower plenum 124 so that it can be connected to cable terminus member 154 and the other items of electronic hardware contained therein.

A further method of mounting hydrophone 18 to platform framework or support structure 16 is illustrated in FIG. 14 in which housing 106 of hydrophone 18 is suspended from structural members 50, 52 and 54, respectively, by means of three tension members or cables 160, 162 and 164 connected, respectively, to helical spring members 166, 168 and 170. Hydrophone cable 148 is used to electrically connect hydrophone 18 to the electronic hardware contained in hydrophone base support 102 attached to a structural member of support structure 16. configuration, hydrophone base support 102 need not be equipped with flexible diaphragm 126.

Platform Position Control:

With reference to FIG. 15, array platform controller circuit 200 comprises, basically, main platform position controller 202 which can comprise a visual display panel (not shown) appropriate for displaying the physical orientation of the platform and status of the various attitude control devices.

Platform position controller 202 is adapted to control the positions of hydraulic actuators or servomotors, 204, 206, 208, 210, 212, and 214 that, respectively, move bows planes 24, stern planes 36, vertical bow planes 28 and 30, and rudders 38 and 40. Platform position controller 202 is also adapted to control buoyancy control systems 218, 220, 222, and 224 that, respectively, control the flow of air and thus the buoyancy of the forward portion 180 of main buoyancy tank 60, the stern portion 182 of main buoyancy tank 60, the upper portion 184 of vertical buoyancy tank 62 and the lower portion 186 of vertical buoyancy tank 62 (FIG. 6).

A schematic diagram for typical buoyancy control system 218 is illustrated in FIG. 16. The schematic diagram for buoyancy control systems 220, 222, and 224 is identical.

The buoyancy control system 218 of FIG. 16 comprises, basically, a unit buoyancy controller 570 electrically connected to each solenoid valve 542, 544, 546 and 548 of modular buoyancy sections 500A, 500B, 500C and 500D, representing main horizontal buoyancy member 60, through control cables 572, 574, 576 and 578, respectively.

Upon the appropriate command signals to unit buoyancy member 570 through control cable 580 from platform position controller 202, any of solenoid valves 542, 544, 546, 548 or emergency ballast release device or charge 582 for one or more modular buoyancy sections 500 can be actuated to inflate or deflate bladder 560 of bladder accumulator 532 or release ballast from ballast tube 512.

Temperature sensor 228 is connected to signal converter 230 for telemetry of the temperature signal to platform position controller 202.

Depth sensor 232 is similarly connected to signal converter 234 for telemetry of the depth sensor signal to platform position controller 202.

Depth sensor 232 and temperature sensor 228 are used to help guide the hydrophone array platform 20, using bow and stern planes 24 and 36, to a depth approaching the sound channel for maximum signal detection.

While in the vertical listening position, it is the primary purpose of flotation member 60 and 62 to maintain platform 10 in its proper attitude and depth. The control planes will be set in a neutral position to create as little turbulence as possible in order to reduce any background noise caused by platform turbulence.

Vertical and horizontal inclinometer transducers 236 and 238, respectively, are also connected to platform position controller 202 to indicated vertical and longitudinal horizontal attitude of array 20 as it is being towed below the ocean surface.

All of the above devices are electrically connected to platform position controller 202 through multi-conductor cable 240 which is attached to tow cable 32.

With reference to FIG. 17, there is illustrated a further embodiment of a platform position control circuit 250.

Platform position control circuit 250 comprises, basically, a platform position controller 252 in digital communication with attitude controller 254 through cable 255.

Platform position controller 252 can be any general purpose computer programmed to send digital information instructions to attitude controller 254. Attitude controller 254 is adapted to decode the digital signals from platform position controller 252 into signals for actuating any of the platform position and attitude control members used for controlling buoyancy, transverse direction and depth.

Since the signal between platform position controller 252 and attitude controller 254 is digital, cable 255 can be either a coaxial cable or fiber-optic cable to minimize weight and bulk and to simplify the number of conductors connected to platform position controller 252.

Thus, the output signal of attitude controller 254 can control the positions of hydraulic actuators or servomotors, 204, 206, 208, 210, 212, and 214 that, respectively, move bow planes 24, stern planes 36, vertical bow planes 28 and 30, and rudders 38 and 40. Attitude controller 254 is also adapted to control buoyancy control systems 218, 220, 222, and 224 that, respectively, control the flow of air and thus the buoyancy of the forward portion 180 of main buoyancy tank 60, the stern portion 182 of main buoyancy tank 60, the upper portion 184 of vertical buoyancy tank 62 and the lower portion 186 of vertical buoyancy tank 62 (FIG. 6).

A typical schematic diagram for buoyancy control system 218 is illustrated in FIG. 16. The schematic diagrams for buoyancy control systems 220, 222, and 224 would be identical.

The buoyancy system 218 of FIG. 16 comprises, basically, a unit buoyancy controller 570 for decoding the digital signals electrically connected to each solenoid valve 542, 544, 546 and 548 of modular buoyancy sections 500A, 500B, 500C and 500D representing main horizontal buoyancy member 60 through control cables 572, 574, 576 and 578, respectively.

Upon the appropriate command signals to unit buoyancy member 570 on control cable 580 from attitude controller 254, any of solenoid valves 542, 544, 546, 548 or emergency ballast release device or charge 582 can be actuated to inflate or deflate bladder 560 of bladder accumulator 532 or release ballast from ballast tube 512.

Temperature sensor 228 is connected to analog-to-digital converter 256 to create a signal that can be read by attitude controller 154 so that the digital temperature signal can be transmitted to platform position controller 252.

Depth sensor 232 is similarly connected to analog-to-digital converter 258 to create a signal that can be read by attitude controller 254 so that the digital depth sensor signal can be transmitted to platform position controller 252.

As discussed previously, depth sensor 232 and temperature sensor 228 are used to help guide the hydrophone array platform 20, using bow and stern planes 24 and 36, to a depth approaching the sound channel for maximum signal detection.

While in the vertical listening position, it is the primary purpose of flotation member 60 and 62 to maintain platform 10 in its proper attitude and depth. The control planes will be set in a neutral position to create as little turbulence as possible in order to reduce any background noise caused by the platform itself Vertical and horizontal inclinometer transducers 236 and 238, respectively, are also connected to platform position controller 202 to indicated vertical and longitudinal horizontal attitude of array 20 as it is being towed below the ocean surface.

Operation of Platform Position Controller:

Because turbulence caused by bow planes 28 and 30, stern planes 36 and rudders 30 and 40 will seriously degrade the ability of array 20 to detect faint underwater sound signals, only flotation members 180, 182, 184 and 186 will be used while platform 10 is being used as a listening platform.

By offsetting the weight of structure 16 with buoyancy of flotation members 180 and 182, coupled with the upward pull of tow cable 32, the horizontal attitude of array 20 is controlled.

By increasing the buoyancy of flotation member 184 over that of flotation member 186, array 20 is maintained in a vertical position.

By using information received from horizontal and vertical inclinometers 236 and 238 to control air into and out of bladder accumulators 532 (in flotation member 500, making up flotation members 180, 182, 184 and 186), automatic control of array 20 attitude will be achieved.

To avoid any additional noise while in the listening position, air is provided to bladder accumulators 532 in flotation members 180, 182, 184 and 186 by a hose or conduit 550 which is attached to towing cable 32. Air to conduit 550 is provided from a separate air compressor (not shown) on board towing vessel 34.

Signal Processing System:

To understand the importance of distinguishing between vertical and horizontal propagating signals, reference is made to FIG. 18 which illustrates a cross-section of the ocean showing axis 700 of a typical sound channel 702 where the velocity of sound is at a minimum. Sound rays 704, 706, 708 and 710 show the path of typical sound rays radiating from sound source 712. Sound ray 714 illustrates a path of a typical sound ray originating along axis 700 of the sound channel.

It will be noted that the sound rays are diffracted as they pass through depths causing a change in the speed of sound as indicated by sound speed graph 716.

It will also be noted that, for a sound source located above axis 700 of sound channel 704, a shadow zone 720 is create between about 15 and 35 nautical miles from sound source 712.

Any passive sonar array located in shadow zone 720 will be unable to hear sounds from sound source 712.

In contrast, in the region from approximately 35 to approximately 55 miles from sound source 712, there is created a convergence zone in which the sound rays tend to converge and where a passive sonar array will easily detect sounds from source 712.

Of course, the ideal location for a passive sonar array is anywhere along sound channel 702. Thus, by using bow and stern planes 24 and 36, respectively, controlled by platform position controller 202 or 252 in conjunction with buoyancy members 60 and 62, platform 10 can be maneuvered to the ideal listening position for receiving horizontally propagating sound signals.

For an array of the present invention approximately 1,500 to 2,000 hydrophones 18 will be required Each hydrophone 18 must, therefore, be uniquely identified for proper control and operation of array 20.

Figure 19:
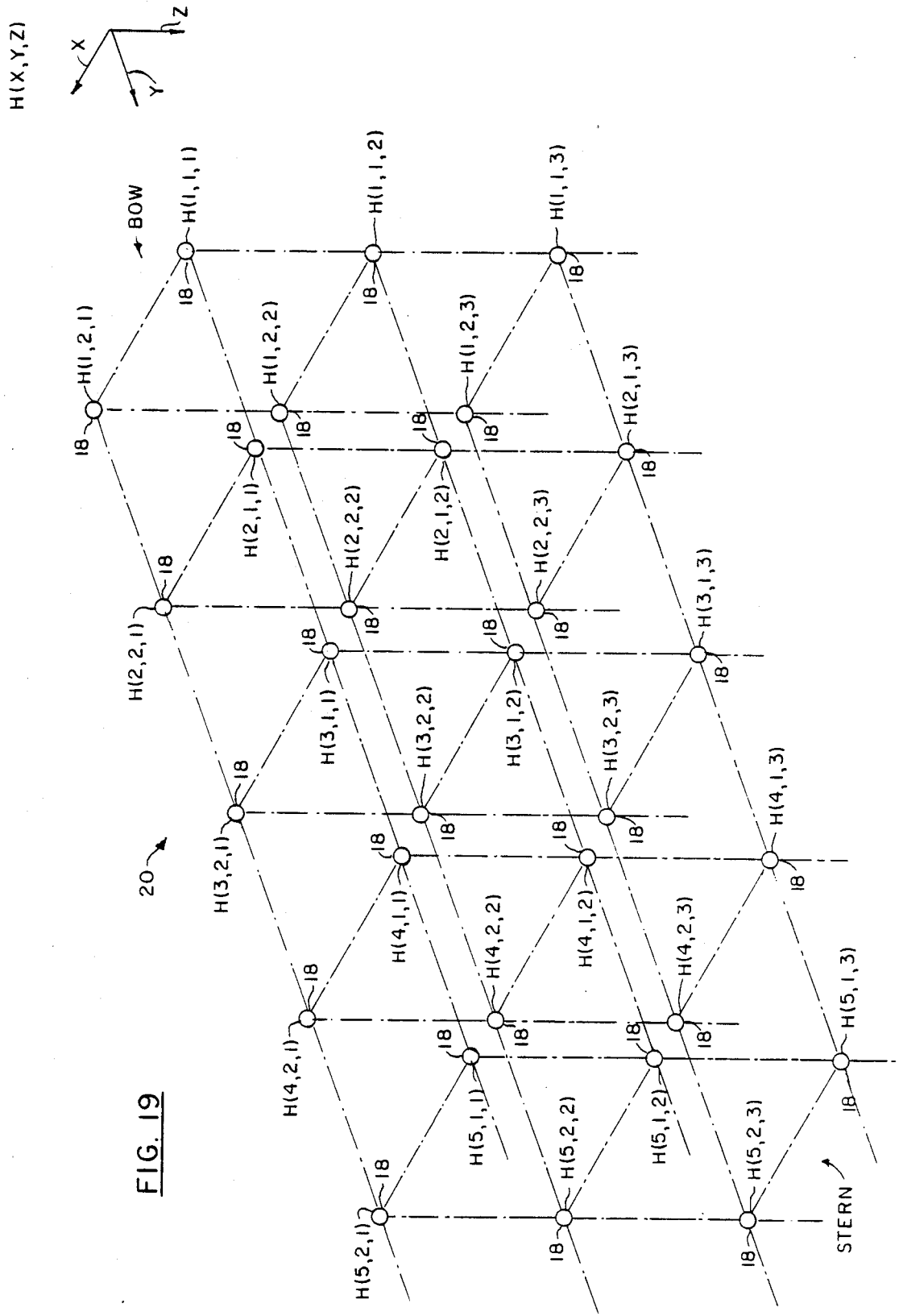
FIG. 19 is an isometric view of a portion of the hydrophone array showing the method of identifying each hydrophone by a unique address.

With reference to FIG. 19 there is illustrated an isometric view of a portion of the hydrophone array 20 of FIG. 1 for the purpose of showing the method of identifying individual hydrophones 18 by matrix notation and the physical relationship of each hydrophone 18 to other hydrophones.

For the present embodiment, hydrophones 18 are designated by numbers increasing in the "X" direction from bow to stern, increasing in the "Y" direction for starboard to port and increasing in the "Z" direction from top to bottom as shown in diagram 200. The individual hydrophones are identified by the notation H(X,Y,Z).

Thus a linear array of hydrophones running the length of array 20 in the "X" direction would be designated H(1 to N,Y,Z) where N is any number from 1 to the Nth hydrophone at the stern of the array. For the portion of the array shown in FIG. 19, N =5.

A planar array in the vertical plane would be designated H(1 to N,Y,1to M).

For the array shown in FIG. 19, this would be H(1 to 5,Y,1 to 3).

It can be seen that array 20 comprises two generally parallel, spaced apart, vertical planar arrays of hydrophones arranged in a rectilinear matrix.

Analog Signal Processing:

With respect to FIG. 20, there is illustrated a schematic circuit diagram for a control system 400 for hydrophone array 20.

Control system 400 comprises, basically, signal processor summer 402 adapted to receive the analog input signal from hydrophone controllers 404, sum the results and transmit the summed results to squarer 414.

Hydrophone controllers 404 are separately connected to each hydrophone 18 through preamplifier 406 by a separate conductor in control cable 408.

The output signal from output port 410 of signal summer 402 is transmitted to signal squarer 414 whose analog output signal is transmitted to averager 416 for transmission to the beam intensity control of horizontal display cathode ray tube (CRT) 418 and vertical display CRT 420. Signal summer and squarer circuits are well known in the art.

Aperture steering controller 426 is connected to each hydrophone controller 404 to detect phase shift or time delay in order to measure aperture lobe vertical and horizontal angle as well as signal direction.

The output signal from ports 428 and 430 of aperture steering controller 426 are, respectively, connected to the polar coordinate steering control for horizontal display CRT 418 and vertical display CRT 420 to synchronize aperture steering with CRT polar coordinate scanning. Such circuits are well known in the art.

Digital Signal Processing:

With reference to FIG. 21 there is illustrated a schematic diagram of a further embodiment of a hydrophone control and signal processing circuit 300 for operation of hydrophones 18 in hydrophone array 20.

Hydrophone control and signal processing system 300 comprises, basically, hydrophone array controller 304 that monitors the overall operation of the hydrophones and flow of sonar signals generated by hydrophones 18.

Hydrophone array controller 304 can be either a general purpose digital computer or a special purpose digital computer adapted to meet the signal processing requirements programmed into special purpose hardware adapted to perform specific functions described herein.

Port 306 of hydrophone array controller 304 is connected to each hydrophone controller 308 through cable 310. Each hydrophone controller is connected to its respective hydrophone 18. Cable 310 is attached to tow cable 32.

Hydrophone controller 308 is shown in greater detail in FIG. 22, and comprises, basically, decoder/encoder controller 318 having its port 320 connected to cable 310.

Decoder/encoder controller 318 is adapted to receive only instructions specifically addressed to it by hydrophone array controller 304 according to the (X,Y, Z) coordinate or matrix system for each hydrophone 18 described above for FIG. 19.

Those instructions can be used to read the instantaneous or RMS output of hydrophone 18, gate the hydrophone signal only for a specific time period, such as, just before and just after a peak instantaneous voltage, sample the hydrophone output for a designated time period to determine frequency and RMS value of the signal strength and otherwise manage, control and initially process the raw data measured by hydrophone 18.

Since each encoder/decoder controller 318 responds only to a signal addressed to it, all communications can be over a common signal cable 30 such as a single coaxial cable or a single fiber of a fiber optics cable.

If faster processing times are needed, parallel processing can be achieved using multiple coaxial cables or optical fibers.

Since the digital signal can be in the megahertz range, it would still be able to effectively monitor sound waves of less than 1,000 Hz.

The conversion to a digital signal at the hydrophone has the advantage of maintaining the accuracy of measuring signal intensity by eliminating the attenuation of an analog signal due to the relatively high impedance for a long multi-conductor cable at the frequencies being measured.

Port 332 of encoder/decoder controller 318 is connected to initial signal processor 326. The main purpose of initial signal processor 326 is to measure both the instantaneous value as well as the RMS value and frequency of the hydrophone output signal and to hold or transmit that information for such time as it may be instructed to do so.

Hydrophone controller 308 further comprises an analog-to-digital converter 328 adapted to convert the analog signal from hydrophone 18 to a digital encoded signal based on periodic voltage sampling of the analog output signal.

Analog-to-digital converter 328 is electrically connected to initial signal processor 326 where both the instantaneous as well as the RMS value of voltage level is determined and signal frequency spectrum can be analyzed.

Gate 330 is connected between analog-to-digital converter 328 and initial signal processor 326 and is controlled from port 332 of encoder/decoder controller 318.

Gate 330 could be incorporated in initial signal processor 326, but has been specifically shown to illustrate the manner in which the output signal from hydrophone 18 can be controlled and sampled.

Gate 330 can also be connected between hydrophone 18 and analog-to-digital converter 328.

Returning to FIG. 21, output port 350 of hydrophone array controller 304 is electrically connected to hydrophone signal processor 352 where the initially processed digital signal data is further processed in a manner to enhance signal-to-noise ratio by summing or squaring the data to provide an analog signal output to control beam intensity for horizontal display CRT 354 and vertical display CRT 356.

Aperture receiving lobe steering control 360 is electrically connected to port 362 of hydrophone array controller 304 and is adapted to coordinate aperture receiving lobe position with the polar coordinate scan of horizontal display CTR 354 and vertical display CRT 356.

For horizontal display CRT 354, 0 degrees is located at the top of the screen and represents the bow of array 20 while 90, 180 and 270 degrees represents, respectively, the starboard, stern and port sides of array 20.

For vertical display CRT 356, 90 degrees represents the starboard side of array 20 while 270 degrees represents the port side of array 20.

Operation:

Because array 20 defines a rectilinear array of equally spaced hydrophones, it can be considered a tuned array. For a fixed hydrophone spacing of 3 feet and a sound velocity in ocean water at roughly 4,800 feet per second, the full wave length frequency would be approximately 1,600 Hz. (half-wavelength frequency would be 800 Hz).

For a 210 foot long, 3-dimensional matrix of hydrophones spaced 3 feet on centers, the array would be tuned to the following fundamental and harmonic frequencies:

TABLE 1

| Hydrophone Number | Wavelength (Feet) | = | Frequency (Hz) |
|---|---|---|---|
| 1 | 3.0 | = | 1,600 |
| 2 | 6.0 | = | 800 |
| 3 | 9.0 | = | 533.3 |
| 4 | 12.0 | = | 400 |
| 5 | 15.0 | = | 320 |
| 6 | 18.0 | = | 266.7 |
| 7 | 21.0 | = | 228.6 |
| 8 | 24.0 | = | 200 |
| 9 | 27.0 | = | 177.8 |
| 10 | 30.0 | = | 160 |
| 11 | 33.0 | = | 145.5 |
| 12 | 36.0 | = | 133.3 |
| 13 | 39.0 | = | 123.1 |
| 14 | 42.0 | = | 114.3 |
| 15 | 45.0 | = | 106.7 |

By sampling every 2nd hydrophone, the array would be tuned to the 800 Hz full cycle wave length.

By sampling every 8th hydrophone, the array would be tuned to the 200 Hz full cycle wave length.

Thus, by using matrix algebra, hydrophone array controller and signal processor 304 can be programmed to systematically scan the frequency spectrum of the signal received by hydrophones 18 of array 20 separate from any purely electronic frequency spectrum analysis.

It can also be seen that hydrophone array controller and signal processor 304 can be programmed in any manner deemed necessary for focusing, aperture lobe steering or other manner of manipulating array reception to discriminate between signal and noise A programming language particularly adapted to handle matrix or multiple vector arrays, such as, APL programming language, can be used to advantage.

Figure 23:
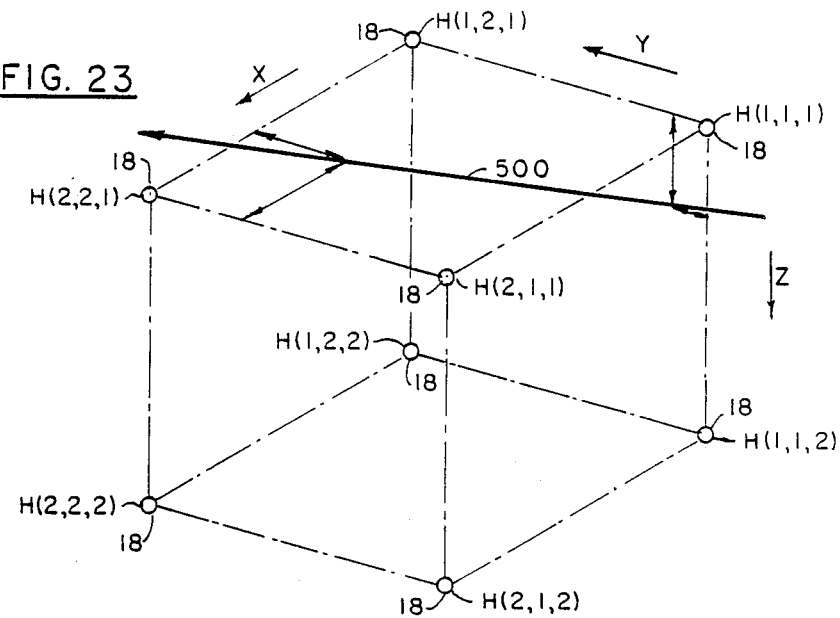
FIG. 23 is an isometric illustration of a set of 8 hydrophone arranged as corners of a cube to illustrate a method of aperture steering.

Aperture Receiving Lobe Steering:

With reference to FIG. 23 there is illustrated an isometric view of a set of 8 hydrophones arranged as corners of a cube. An underwater sound propagation ray 500 is shown entering the first Y-Z plane and exiting the first X-Y plane. A planar sound pressure wave front would be perpendicular to sound propagation ray 500. Thus a pressure wave front of sound ray 500 would first be detected by hydrophone H(1,1,2), then detected sequentially by hydrophone H(1,1,1), H(2,1,1), H(1,2,1), h(2,1,2), H(2,1,1), H(2,2,1) and finally H(2,2,1).

Figure 24:
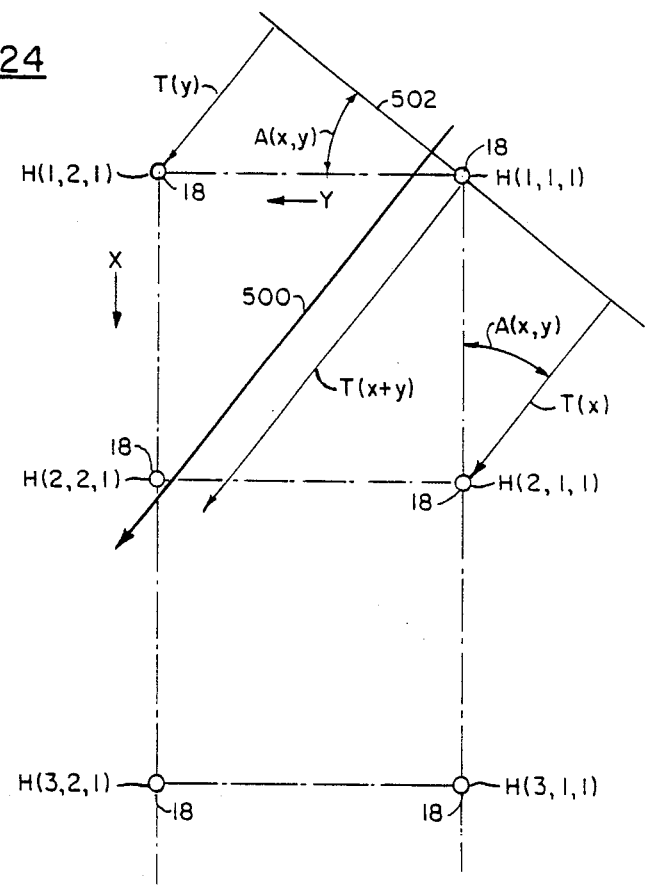
FIG. 24 is a plan view of the top plane of the hydrophone array of FIG. 23.

With reference to FIG. 24 there is illustrated a plan view of the 8 hydrophone cube shown in FIG. 23 in which sound pressure wave 502 of sound ray 500 is shown passing through the first X-Y plane.

For the purpose of simplifying the explanation, the method of steering the array sound receiving aperture lobe or beam will be discussed on the basis of a two-dimensional model. The same method can be used when adding the third dimension.

Assuming an incoming sound signal at an angle A(x,y) to the longitudinal axis of the array, the time delay for pressure wave 502 to reach hydrophone H(1,2,1) after being detected by hydrophone H(1,1,1) is indicated by T(y). The time delay for pressure wave 502 to reach hydrophone H(2,1,1) is indicated by T(x).

In actual time, these values would be:

| | |
|---|---|
| T(x) | = D(Sin A(x,y))/V |
| T(y) | = D(Cos A(x,y))/V |
| T(x + y) | = D(Cos A(x,y) + Sin A(x,y)/V | where
D = spacing of hydrophones (Ft.)
V = velocity of sound in water (Ft/Sec)

Therefore, to find the incoming direction of a sound signal, the instructions to each hydrophone controller 308 would be as follows:

TABLE 2

TURN H(1,2,1) ON AT T(Y) SEC. AFTER H(1,1,1) PEAK OUTPUT
TURN H(1,1,1) ON AT T(X) SEC. AFTER H(1,1,1) PEAK OUTPUT
TURN H(2,2,1) ON AT T(X + Y) SEC. AFTER H(1,1,1) PEAK OUTPUT

The same instructions are simultaneously sent other similar sets of hydrophones in the array.

Thus, for the digital system of FIG. 21, by sweeping or scanning 360 degrees, in one degree or less increments (corresponding to time delays), storing the digital data in initial signal processor 326 of hydrophone controller 308 for transmission to hydrophone array controller 304 and hydrophone signal processor 352, for each increment, a maximum signal will be indicated at the angle where the instructed delay equals the delay of the incoming sound pressure signal.

The process will be similar for the analog system of FIG. 20 but without necessarily storing the signal.

It will be noted that as the scan is being performed, the Sine and Cosine will change from a positive to a negative value.

Figure 25:
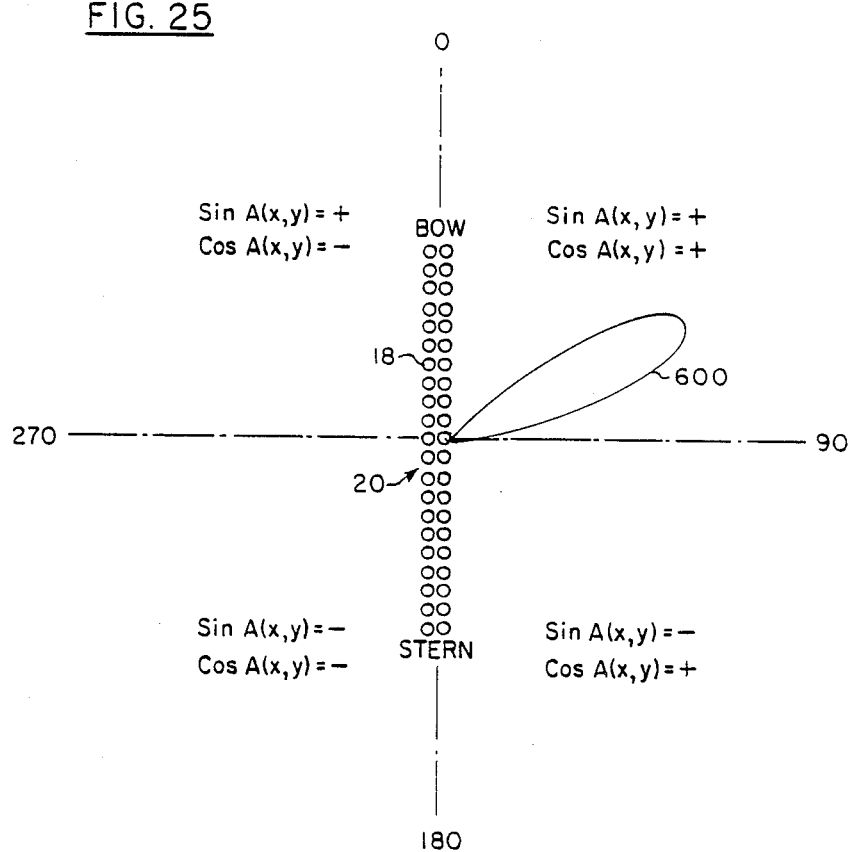
FIG. 25 is a diagrammatic illustration of a plan view of the hydrophone array showing the the Sine-Cosine relationship between the scanning quadrants.

With reference to FIG. 25 there is illustrated a plan view of array 20 showing the quadrants in which the Sin A(x,y) and Cos A(x,y) are positive and negative.

It can be seen where Sin A(x,y) is positive, the incoming signal will be between 0-90 and 270-360 degrees. Where Sin A(x,y) is negative, the incoming signal will be between 90 and 270 degrees.

It can also h=seen where Cos A(x,y) is positive, the incoming signal will be between 0 and 180 degrees. Where Cos A(x,y) is negative, the incoming signal will be between 180 and 360 degrees.

Thus, using matrix algebra combined with the positive or negative value of the trigonometric Sine or Cosine of the angle of the aperture receiving lobe, the instruction to each hydrophone would indicate a positive or negative time frame for establishing an initial starting time for measuring time delay, according to which quadrant is being scanned.

It can also be seen that by using matrix algebra combined with solid geometry and trigonometry techniques to establish common time delays between hydrophones in the X, Y and Z directions, scanning can be performed in three dimensions.

Furthermore, by using matrix algebra to establish individual time delays between hydrophones, additional dimensions can be added to permit aperture focusing by varying the sound reception curvature of the array.

Thus it can be seen that through accurate measurement of time delay, the underwater sound detection apparatus 10 of the present invention is capable of measuring signal coherence and readily distinguishing a coherent from an incoherent incoming signal.

Coherence is defined herein as the correlation between the signal that arrives at one underwater sound detector with the same signal that arrives at another underwater sound detector.

Active Sonar System:

In certain circumstances, where an underwater vessel is maneuvering at reduced speed and sound attenuation techniques have been applied to that vessel to reduce hull vibration, long range detection by passive means is very difficult.

For the present apparatus, by switching it to an active mode to generate a sound pressure wave pulse for a fraction of a second propagating along a single path array from the array and then switching back to a passive or listening mode to detect time delay and bearing of any reflected sound wave pulse, the detection range can greatly increased.

It has been found that by generating and focusing a coherent sound wave pulse beamed in the horizontal plane to avoid reflection from the water surface or the bottom surface and by varying beam vertical angle or the depth of the array from a position near the surface of the water to a depth approaching the sound channel, the convergence zone problem encountered when operating in the passive sonar mode is eliminated and 100% coverage for the full range, approximately 100 nautical miles, can be achieved for the active sonar.

Figure 26:
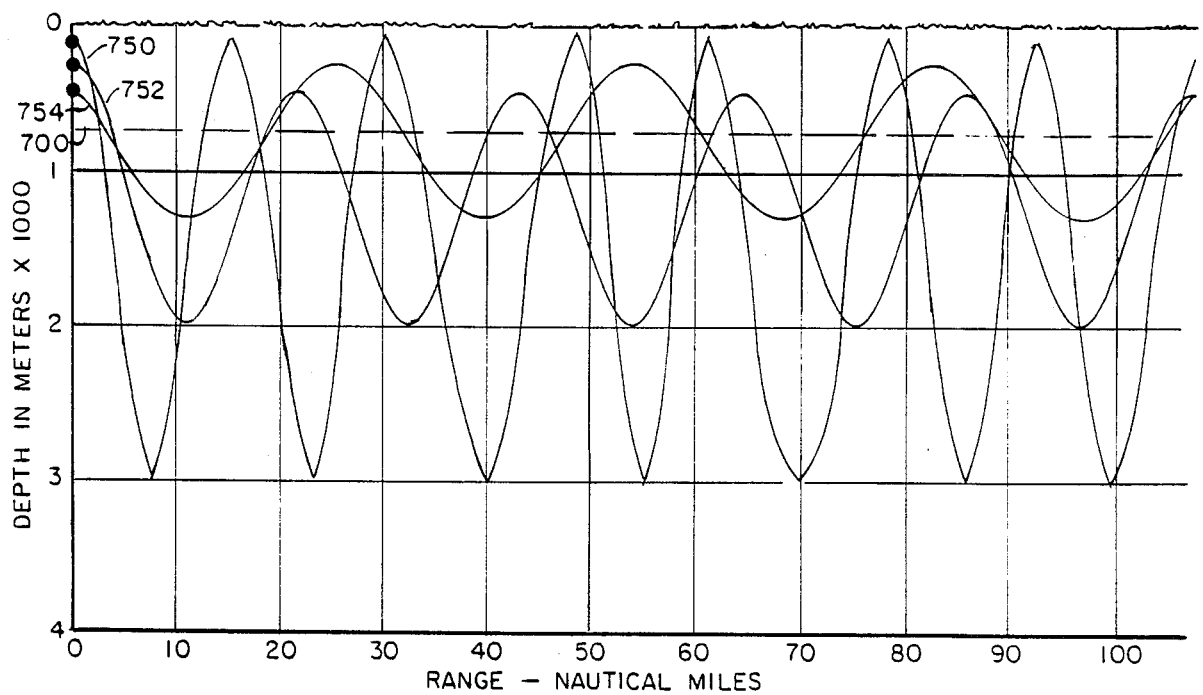
FIG. 26 is a typical elevational cross section of the North Pacific Ocean showing computer generated sound ray paths for an active sonar pulse generated at three different depths by the under water sound detection apparatus of the present invention.

With reference to FIG. 26 there is illustrated a typical cross section of the North Pacific Ocean showing computer generated paths of several typical sound rays 750, 752 and 754 for an active sonar pulse generated at several depths by the sonar array platform of the present invention operating as an active sonar system. The depth of minimum sound velocity (the sound channel, see FIG. 18) is shown in FIGS. 26 and 27 approximately 700 meters (765.5 yards) below the surface.

Figure 27:
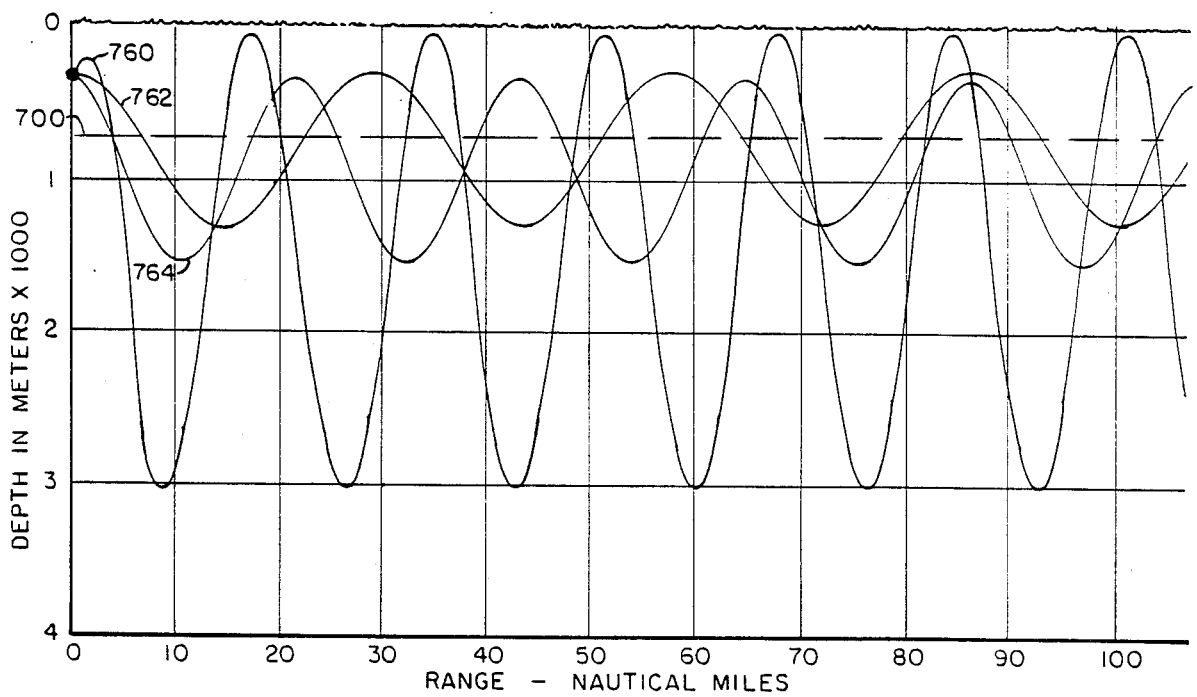
FIG. 27 is a typical elevational cross section of the North Pacific Ocean showing computer generated sound ray paths for an active sonar pulse generated at a constant depth but at three different launch angles by the underwater sound detection apparatus of the present invention.

With reference to FIG. 27 there is illustrated a typical cross section of the North Pacific Ocean showing computer generated paths of several typical sound rays for an active sonar pulse generated at several vertical angles, namely, 75 degrees for sound ray 760, 90 degrees for sound ray 762, and 105 degrees for sound ray 764, for a fixed depth of the sonar array.

Both figures illustrate sound ray paths for an active sonar range of approximately 100 nautical miles.

It can be seen that the pattern of sound ray paths spanning a large arc or solid angle will cover 100% of the range in a generally uniform manner without any blank regions as would be the case for the array operating only in the passive mode.

Active Sonar Apparatus:

Although separate electro-acoustic transducers can be used, respectively, to detect and generate sound pressure waves, since most electro acoustic transducers used as hydrophones can be adapted to both generate as well as detect sound pressure waves, this combined use put to a single electro-acoustic transducer is the technique described for the present invention. It is, however within the scope of the present invention to use separate hydrophones for transmitting the sonar pulse and receiving or detecting the reflected pulse.

Figure 28:
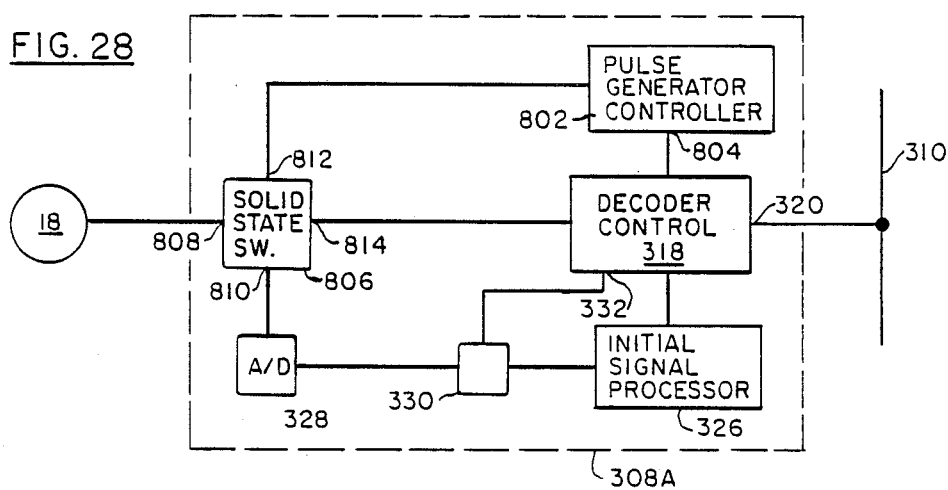
FIG. 28 is a schematic circuit diagram of an individual hydrophone controller system modified to produce an active sonar pulse.

With reference to FIG. 28 there is illustrated a further embodiment of hydrophone controller 308 designated as hydrophone controller 308A.

Hydrophone controller 308A comprises, basically, the same elements as hydrophone controller 308 of FIG. 22, namely, decoder/encoder controller 318 having its port 320 connected to cable 310, initial signal processor 326, which is also connected to decoder/encoder 318 and analog-to-digital converter 328 through gate 330. These devices perform the same functions as previously described for FIG. 22.

In addition to the above items, there is included pulse generator controller 802 having its input port 804 electrically connected to decoder/encoder controller 318. Pulse generator controller 802 can be any frequency generator or oscillator device (not shown), common in the art, for generating an alternating current frequency sufficient to activate the electro-acoustic transducer or hydrophone 18. In addition, pulse generator controller 802 is also provided with a gating device (not shown), also common in the art, for controlling the duration of the pulse in accordance with instructions from hydrophone array controller 304 through decoder control 318.

A solid state switch 806 is provided to Aswitch hydrophone 18 from an active or pulse generating mode to a passive or listening mode. Solid state switch 806 is a single pole-double throw switch in which the single pole is connected to pole port 808, and, in turn, to hydrophone 18, with the separate pole contacts connected, respectively, to analog-to-digital contact port 810 and pulse generator contact port 812. Switch control port 814 is also connected to decoder control 381 to coordinate the switching function with the generation of the sonar pulse generated by pulse generator controller 802 used to activate hydrophone 18.

Active Sonar Operation:

The basic operation of hydrophone controller 308A is controlled by hydrophone array controller 304 which can be a general purpose digital computer or specialized computer adapted to perform specific scanning and other discriminating functions and calculations, as previously described.

For hydrophone controller 308A, hydrophone array controller 304 controls not only the flow of sound pressure wave signals detection by hydrophones 18 when in the passive or listening mode but also now controls the timing, duration and frequency of the sound pressure wave signals generated by hydrophones 18 when in the active or pulse generation mode.

Specific Operation:

As described previously for the passive sonar array, the direction and shape of the receiving lobe for the incoming signal can be shaped to any vertical and horizontal solid angle by varying the time delay between adjacent hydrophones for receiving the signal.

In a similar manner, the reverse is true. By delaying the timing of the sound pressure wave pulse generated between adjacent hydrophones, the transmitted sound pressure wave lobe can be varied as to direction and horizontal and vertical solid angle.

For example, by initiating a pulse to activate hydrophones on the left side of array 20 and then activating the hydrophones on the right side of the array 20 at the instant the left side sound pressure wave has reached the right side hydrophones, a coherent single sound pulse will be generated traveling away from the right side of the array is a single direction.

It has been found that by shaping or aiming the horizontal arc or solid angle of the transmitted sound pressure wave beam to avoid reflections, i.e., mitigate reverberations, from the ocean surface and the ocean bottom or by transmitting sonar pulses in a narrow beam at varying vertical angles within a horizontal range to avoid reflections, i.e., mitigate reverberations, from the ocean surface and ocean bottom, maximum active sonar range can be achieved.

By shaping the receiving sound pressure wave lobe to receive the reflected signal in the horizontal direction, the signal-to-noise ratio can be further significantly increased as previously described.

By tuning the pulse frequency generated by the hydrophones to one of the harmonics of the array, such as, 800 Hz, 400 Hz or 200 Hz (Table 1), the signal-to-noise ratio is further increased.

For the present array 20 of the present invention, a realistic range of approximately 100 nautical miles can be achieved.

The sonar power requirements for a range of 100 nautical miles can be determined by the following equation:

$$SL = DT + (2 \times TL) - TS + (NL - DI)$$

where:
SL = Source Power Level (dB)
DT = Detection Threshold (dB)
TL = Transmission Loss (dB)
TS = Target Strength (dB)
NL = Noise Level (dB)
DI = Directivity Index (dB)

Transmission loss (TL), for this example, was determined by sound ray tracing compute program taking into consideration spreading loss of the beam, sound absorption of the water, ray launch angle, sonar transmitter depth, sonar receiver depth, and sound speed vs. depth profile.

For a 100 nautical mile range using a pulse frequency of 800 Hz in an ocean environment, the transmission loss (TL) will be approximately 100 dB:

Assume:

| | | |
|---|---|---|
| DT | = | 15 dB |
| 2 × TL | = | 200 dB |
| −TS | = | −15 dB |
| (NL − DI) | = | 30 dB |
| SL | = | 230 dB |

For an active sonar pulse, the total power of the array in kilowatts can be determined from the following equations:

$$SL = 171.5 + 10 \, LOG[P(watts)] + DI$$

Assume:

| | | |
|---|---|---|
| SL | = | 230.0 dB re 1 Micropascal |
| −DI | = | −25.0 dB |
| | | −171.5 dB |

-continued

| P(dBW) | = | 33.5 dBW = 2.2 Kilowatts |
|---|---|---|

For the array 20 of the present invention having approximately 1,000 hydrophones per side, each hydrophone must have a power output of at least 2.2 watts, an output easily attainable by current art electro-acoustic transducers.

For a range of 100 nautical miles, the path length for a sound pressure wave reflected from an object at that distance may vary because of the oscillating shape of the ray path. In practice, however, this variation in sound path length will be roughly 5% so that for the following examples, the actual straight line distance will be used as the path length.

As an approximation, assuming an average velocity of sound at 4,800 feet per second for a round trip of 200 nautical miles (100 nautical miles straight line maximum range), the approximate time delay would be 253.3 seconds (4.22 minutes) for a sound pressure wave pulse reflected from an object at maximum range of 100 nautical miles.

With this in mind, several methods of operating the sonar array system of the present invention are described below. For the array of the present invention, other methods can also be used such that the following description is not intended to limit the scope of the present invention.

The first method of operating array 20 of the present invention utilizes the maximum range of the array and techniques that overcome the convergence zone problems encountered when using the array solely in the passive mode.

In the first method a series of 10 one second duration active pulses having a pulse beam shaped to define a vertical and horizontal solid angle of approximately 5 degrees are directed at various vertical launch angles propagating in a single direction away from array 20. The maximum upper and lower extremes in pulse launch angle direction are limited so that the sound ray path will avoid reflection from the surface of the ocean on the one hand and reflection from the bottom of the ocean on the other.

For this operation an appropriate command is sent from hydrophone array controller 304 to decoder control 318 to switch solid state switch 806 to electrically connect pulse generator controller 802 to hydrophone 18 Pulse generator controller 802 then energizes hydrophone 18 causing it to produce a one second pulse at a predetermined frequency as instructed by hydrophone array controller 304.

The timing of the activation of the individual hydrophones 18, as determined by hydrophone array controller 304 will, as previously described, determine the horizontal bearing and vertical azimuth of the transmitted pulse as well as the horizontal and vertical solid angle of the pulse beam transmitting lobe.

The vertical bearing angle could be, for example, as much as 50 degrees, whereby 10 one second pulse would be transmitted at 5 degree vertical angle increments. The horizontal bearing of the transmitting lobe would remain in the same position for the entire series of pulses transmitted. This scanning method would cover roughly 100% of the range as shown in FIG. 27.

At 100 nautical miles, the maximum time delay, as previously noted, would be 253.3 seconds (4.22 minutes).

After the series of pulse are transmitted array 20 is immediately converted to the passive mode whereby hydrophone array controller 304 sends an instruction to decoder controller 318 of hydrophone controller 308A to switch solid state switch 806 to electrically connect analog to digital converter 328 to hydrophone 18 thus connecting it also to initial signal processor 326 through gate 330, thus placing hydrophone 18 in the passive or listening mode.

In the passive or listening mode, hydrophone array controller 304 then sends instructions to the various hydrophones to shape the listening or receiving lobe to define a vertical arc or solid angle representing the maximum angle defined by the series of pulses transmitted by array 20 while in the active mode and a horizontal arc or solid angle defined by the horizontal arc or solid angle of the transmitted beam lobe.

While in this particular mode, array 20 will achieve its maximum signal to-noise ratio for receiving a reflected pulse from an object at or near the maximum range.

It should be noted that for these long distances, the energy of the reflected pulse will be integrated over time by the circuitry of initial signal processor 326 to achieve maximum sensitivity and discrimination.

It can be seen that, for maximum range, the scanning time will be relatively long due to the long distance involved. For 40 degree increments at a delay time of approximately 4 minutes per increment, a 360 degree scan, consisting of 9 increments, would take approximately 36 minutes.

The second method of operating array 20 of the present invention is better adapted for shorter ranges, 50 miles or less where attenuation of the active sonar signal is not so great and detection threshold of array 20 is not as critical.

At 50 nautical miles the maximum time delay for a transmitted pulse would be 126.6 second (2.1 minutes).

For this second method, the active pulse beam or transmitting lobe is adapted to scan in a horizontal polar manner with the transmitted beam shaped by hydrophone array controller 304 to define a horizontal arc or solid angle of 40 degrees and vertical arc or angle of a size whereby the maximum upward angle sound ray would not be reflected by the ocean surface and the maximum lower angle sound ray would not be reflected by the ocean bottom.

This vertical arc or solid angle would be accomplished using hydrophone array controller 304 to send instructions to decoder control 318 and frequency generator controller 802 of hydrophone controller 308A to delaying activating the hydrophones in the vertical direction beginning at the center and progressing, symmetrically, vertically up and down array 20 sufficiently to form transmitting beam lobe 822 (FIG. 29) into the desired solid angle.

Transmitting lobe 822 would be followed by the passive receiving lobe also scanning in a horizontal polar manner.

Figure 29:
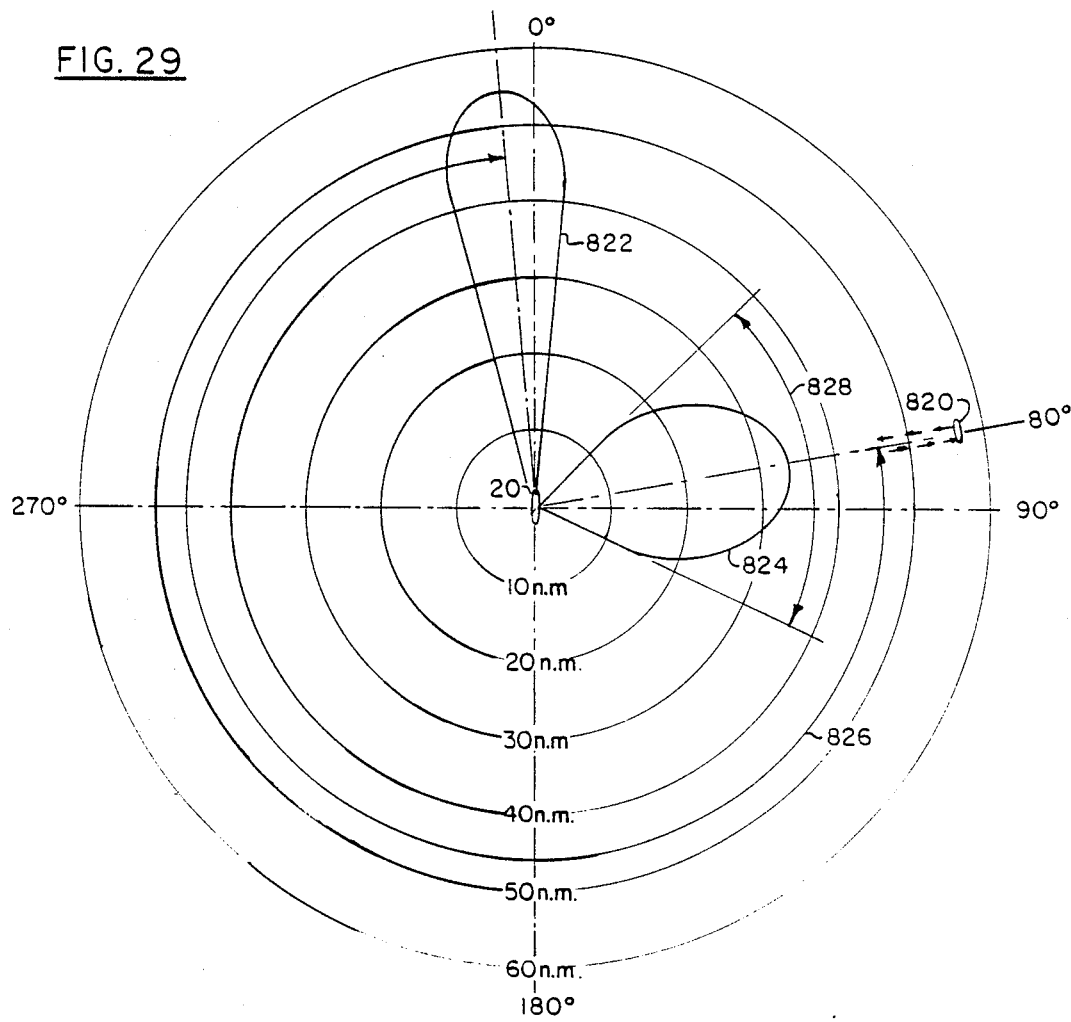
FIG. 29 is a plan view illustrating the use of the underwater sound detection apparatus of the present invention as a combined active and passive sonar system.

With reference to FIG. 29 there is illustrated a plan view of array 20 similar to FIG. 25 showing an active pulse beam or transmitting lobe 822 having a narrow horizontal arc or solid angle scanning in a clockwise direction followed by a passive or receiving lobe 824 having a greater horizontal solid angle also scanning in a clockwise direction but lagging behind active transmitting lobe 822.

For example, assure a scanning rate of 20 degrees per 10 seconds. For these parameters, a complete 360 degree scan would take 100 seconds (3.0 minutes)

For each 20 degrees of scan, pulse generator controller 802 is activated to switch solid state switch 806 to electrically connect pulse generator controller 802 to hydrophone 18 and immediately generate a 1.0 second fixed frequency pulse (ranging from 100 Hz to 1,000 Hz) to activate hydrophone 18 followed immediately by switching solid state switch 806 to electrically connect hydrophone 18 to analog to digital converter 328 and initial signal processor 326 through gate 330. Thus hydrophone 18 is in the passive or listening mode for 9.0 seconds or 90% of the time.

Assure a reflecting object 820 is located at a range of 55 nautical miles straight line bearing 80 degrees from north to the right of array 20, as shown in FIG. 29.

At 55 nautical miles (straight line) the round trip time for the pulse will be approximately 139.3 seconds (2.32 minutes).

The pulse being reflected is, of course, the one transmitted when active or transmitting lobe 822 was at 80 degrees.

For passive or receiving lobe 824 to receive the reflected pulse it must be following transmitting lobe 824 by a time delay approximating the time delay of the reflected sonar pulse or, in this example, approximately 139.3 seconds (278.6 degrees at a scan rate of 20 degrees per 10 seconds).

Therefore, the angle 826 between the centerline of transmitting lobe 822 and any point within the solid angle of receiving lobe 824 should be approximately 278.6 degrees in order to detect the reflected sonar pulse.

When the reflected pulse is detected by receiving lobe 824, its time delay angle behind transmitting lobe 822 is established so that the range of the reflecting object is known between the time limits as measured by the horizontal angle 828 of passive or receiving lobe 824.

By adjusting the horizontal angle 828 or passive or receiving lobe 824, the maximum and minimum range limits can be set.

Thus, scanning for shorter ranges, for example, up to 50 to 60 nautical miles, would proceed according to a series of annular rings having a predetermined horizontal solid angle of receiving lobe 824 and predetermined angular lag of receiving lobe 824 behind transmitting lobe 822.

A spiral scan can also be achieved by incrementally increasing the lag or delay angle of receiving lobe 824 behind transmitting lobe 822 for each increment of scan by transmitting lobe 822.

Figure 30:
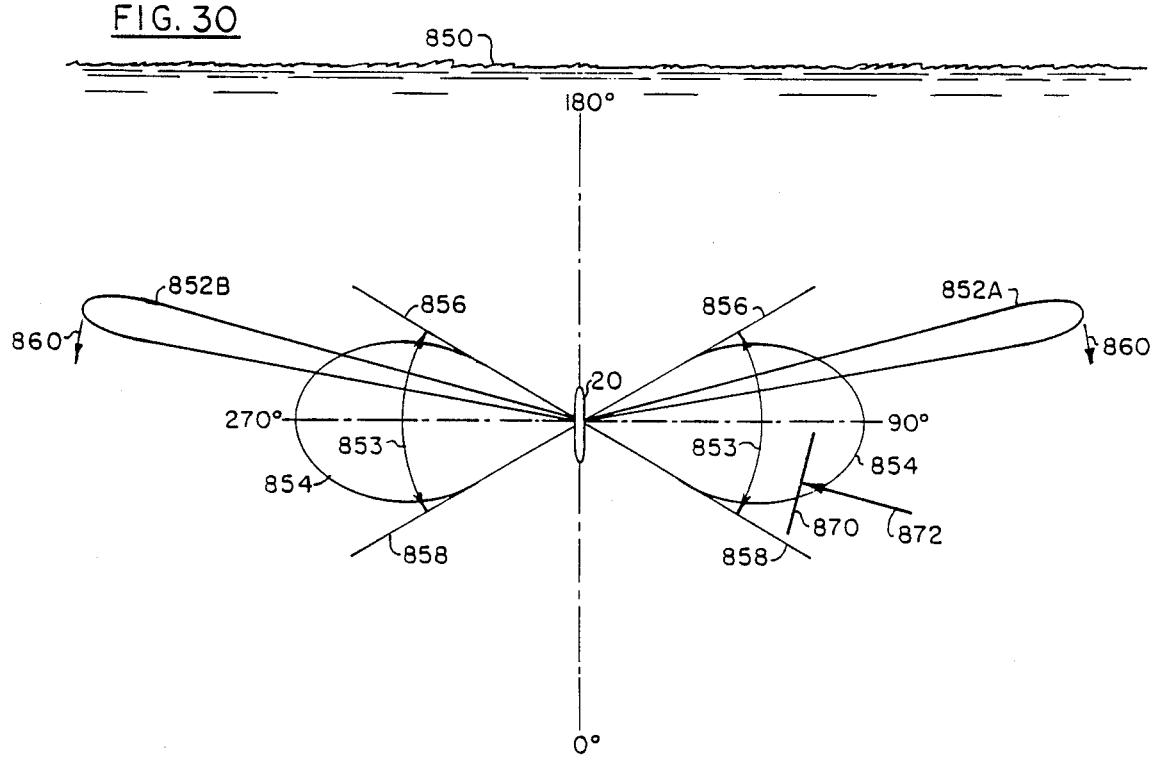
FIG. 30 is a cross-sectional, elevational of the underwater sound detection apparatus of the present invention illustrating a typical active transmitting and passive listening sonar lobes for long range scanning.
Figure 31:
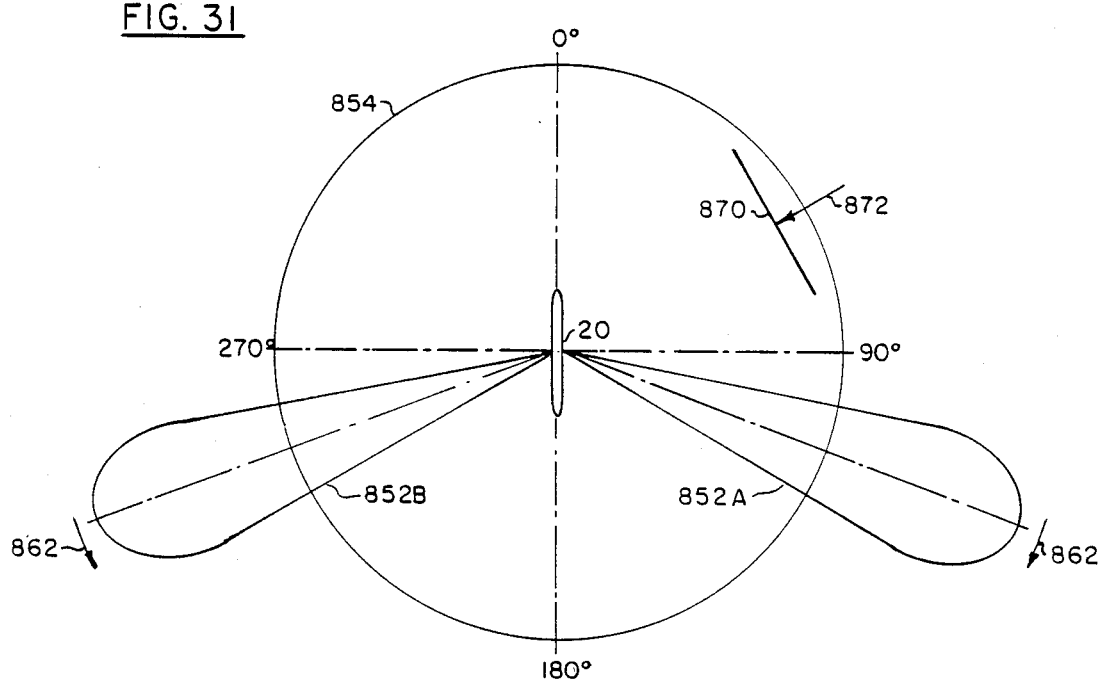
FIG. 31 is a plan view of the underwater sound detection apparatus of the present invention illustrating a typical active transmitting and passive listening sonar lobes for long range scanning shown in FIG. 30.

The third method of scanning utilizes a different method best illustrated by FIGS. 30 and 31.

FIG. 30 is a cross-section, elevational view of array 20 in an ocean environment located at a preset depth below ocean surface 850 illustrating a typical active sonar transmitting lobes 852A and 852B and a passive sonar receiving or listening lobe 854.

FIG. 31 is a plan view looking down from the ocean surface on array 20 and illustrating the corresponding positions of typical active sonar transmitting lobes 852A and 852B and passive sonar receiving or listening lobe 854 of FIG. 30.

In FIGS. 30 and 31, active or transmitting lobes 852A and 852B are adapted to radiate simultaneously in two mirror image directions from array 20 for each active pulse.

In this third method, a series of one second duration active pulses having a pulse or transmitting beam shaped to define a vertical and horizontal solid spherical angle of approximately 5 and 40 degrees, respectively, are, in FIG. 30, directed at 5 degree vertical launch angles along a single bearing propagating in two directions away from array 20. The maximum upper and lower extremes in pulse launch angle direction, as indicated, respectively, by radial lines 856 and 858, are limited so that the sound ray path will avoid reflection from the surface and bottom of the ocean.

In this third method each side of array 20 is operated as a single, planar, sonar sound source that is adapted to radiate an active pulse or transmitted sonar signal beam by delaying activation of adjacent hydrophones causing the beam to propagate away from array 20 in equal but opposite, mirror image directions away from the plane of the array. By operating both sides of the array in the same manner or phase, the twin, mirror image beams formed by each side of the array can be made to coincide and thus reinforce each other.

In other words, by sequentially activating adjacent hydrophones on both sides of array 20 beginning at one end of the array, two mirror image transmitting beams are created for each side of the array propagating away from the U array at an angle determined by the time delay between adjacent hydrophones.

If the sequential time delay propagation is in the same direction for both sides of the array, the two mirror image beams generated by each side will be coincident.

Thus, transmitting lobe 852A is, in reality, the combined transmitting beams formed by superimposing the right hand, mirror image beam created by the right side planar matrix of hydrophones of array 20 on the right hand, mirror image beam created by the left side planar matrix of hydrophones of array 20.

In a similar manner, transmitting lobe 852B is, in reality, the combined transmitting beams formed by superimposing the left hand, mirror image beam created by the right side planar matrix of hydrophones of array 20 on the left hand, mirror image beam created by the left side planar matrix of hydrophones of array 20.

For a vertical solid angle scan of 30 degrees, from 75 to 105 degrees, as shown in FIG. 30, 6 pulses would be required for a full scan of the solid angle. This would result in approximately 6 seconds per vertical scan. The direction of vertical scan is indicated by arrays 860.

Assuming a horizontal scan increment of 40 degrees, and since scanning is performed simultaneously in two directions, the total 360 degree scanning time would be 54 seconds (0.9 minutes). The direction of horizontal scan is indicated by arrows 862.

For this active scanning operation, an appropriate command is sent from hydrophone array controller 304 to decoder control 318 to switch solid state switch 806 to electrically connect pulse generator controller 804 to hydrophone 18. Pulse generator controller 804 then energizes hydrophone 18 causing it to produce a one second pulse at a predetermined frequency as instructed by hydrophone array controller 304.

The timing of the activation of the individual hydrophones 18, as determined by hydrophone array controller 304 will, as previously described, determine the horizontal and vertical bearing of the transmitted pulse as well as the horizontal and vertical solid angle of the pulse beam transmitting lobe.

When the active scan in completed, array 20 is placed in the passive or listening mode by hydrophone array controller 304 instructing decoder controller 318 of hydrophone controller 308A to switch solid state switch 806 to electrically connect hydrophone 18 to initial signal processor 326, thus placing hydrophone 18 in the passive or listening mode, as previously described for the prior scanning methods.

In this third method, the shape of receiving or listening lobe 854 is arranged to receive only signals in the vertical direction matching the maximum upper and lower limits of the launch angles of transmitting lobes 852A and 852B, as shown in FIG. 30, while maintaining a 360 degree horizontal listening configuration for signals arriving within this limited vertical angle.

When a reflected sound signal represented by sound pressure wave front 870, traveling in the direction indicated by sound ray 872 passes through sonar array 20 and is detected by hydrophones 18, the time delay of sound signals stored in initial signal processors 326 are measured by hydrophone array controller 304 whereby calculations are made using the velocity of sound in water in accordance with well known trigonometric equations to determine sound ray bearing and azimuth.

The time delay measurements can be made by sending a timing or master clock signal simultaneously to all decoder controllers 318 and initial signal processors 326 so that when each initial signal processor sends its data to hydrophone array controller 304, it will include not only the data concerning the magnitude and frequency of the received pulse but also the time signal pulse number generated by master clock in hydrophone array controller 304.

Knowing the accurate fixed location of each hydrophone and the time delay between adjacent as well as remote hydrophones, the sound ray path can be calculated.

Thus, a 360 scan, performed in nine 40 degree segments, extending from approximately 86 nautical miles to 100 nautical miles would be approximately 54 seconds plus a listening time of 253.3 seconds (4.22 minutes) or a total of 307.3 seconds (5.12 minutes).

The above third method of scanning assures that the activation delay time between adjacent hydrophones on each side of the array for steering the transmitting beam will be in the same direction so that the two mirror image transmitting beams generated by each side of the array will be coincident.

If the activation delay time between adjacent hydrophones on each side of the array for steering the transmitting beams is in the opposite direction from each other, then four transmitting beams will be created each occupying one quadrant of the horizontal scan, the two mirror image transmitting beams generated by the right side of the array radiating away from the array 180 degrees from the direction of the two mirror image transmitting beams generated by the left side of the array.

For this scanning configuration the scanning time would be reduced to 27 seconds plus 253.3 seconds waiting period, or a total of 280.3 seconds (4.67 minutes).

A further use of the active sonar array A20 of the present invention can be made to detect and measure the depth of geologic strata below the ocean bottom.

Because of the high total output sonar signal generating power of array 20, a low frequency (100–800 Hz) sonar pulse can be directed downward to the ocean bottom. Because sound reflectance of the ocean bottom is roughly proportional to the sonar frequency, low frequency pulses below 800 Hz are only partially reflected at the interface of the ocean bottom with the water while higher frequency pulses are almost totally reflected.

For the low frequency pulses, the energy not reflected passes into the various geologic strata where some of the energy is absorbed and some is partially reflected and refracted where the density of the strata changes. These reflected sound waves are then detected by array 20 of the present invention and analyzed by hydrophone array controller 304 according to time delay and intensity to determine depth and composition of the strata.

Although the preferred embodiment has been described in detail, is can be seen that a person having skill in the art may conceive other embodiments employing comparable elements or that certain elements may be modified, combined or changed but still come within the scope of the following claims.

I claim:

1. An underwater sound detection apparatus comprising
    a plurality of omni-directional electro-acoustic transducers arranged in a generally rectangular three-dimensional array comprising at least two parallel planes of electro-acoustic transducers, the spacing between adjacent electro-acoustic transducers being fixed and equal in all rectangular coordinate directions,
    means for detecting signals generated by sound pressure waves impinging upon said plurality of electro-acoustic transducers,
    means for processing said signals generated by said electro-acoustic transducers to determine the correlation between the signal that arrives at one electro-acoustic transducer with the same signal that arrives at another electro-acoustic transducer, and
    means for displaying said processed signals.

2. The underwater sound detection apparatus as claimed in claim 1 wherein said means for detecting signals generated by said plurality of electro-acoustic transducers comprises
    a hydrophone controller comprising
    means for measuring magnitude of the output signal from said electro-acoustic transducer,
    means for storing said measured magnitude of output signal,
    means for transmitting said stored measurement to said means for processing said signals generated by said electro-acoustic transducers, upon command, to determine the correlation between the signal that arrives at one electro-acoustic transducer with the same signal that arrives at another electro-acoustic transducer.

3. The underwater sound detection apparatus comprising
    a plurality of omni-directional electro-acoustic transducers arranged in a generally rectangular three-dimensional array comprising at least two parallel planes of electro-acoustic transducers, the spacing between adjacent electro-acoustic transducers being fixed and equal in all rectangular coordinate directions,
    means for defining an array receiving aperture lobe to receive incoming pressure wave signals for a predetermined solid angular range, said predetermined solid angular range having a maximum vertical arc range in which the maximum upward vertical angle is defined by the angle at which the surface reverberation noise is reduced to a level less than the ocean ambient noise level, and the maximum vertical downward angle is defined by the angle at which the bottom reverberation noise is reduced to a level less than the ocean ambient noise level, and a maximum horizontal arc range of 360 degrees of horizontal arc means for detecting signals generated by sound pressure waves impinging upon said plurality of electro-acoustic transducers, means for processing said signals generated by said elecrto-acoustic transducers to determine the correlation between the signal that arrives at one electro-acoustic transducer with the same signal that arrives at another electro-acoustic transducer, and means for displaying said processed signals.

4. The underwater sound detection apparatus comprising a plurality of omni-directional electro-acoustic transducers arranged in a generally rectangular three-dimensional array comprising at least two parallel planes of electro-acoustic transducers, the spacing between adjacent electro-acoustic transducers being fixed and equal to all rectangular coordinate directions, means for detecting signals generated by sound pressure waves impinging upon said plurality of electro-acoustic transducers, means for measuring pressure wave signals arriving at said array along a horizontal plane, means for measuring pressure wave signals arriving at said array along a vertical plane, means for comparing said signals arriving along a said horizontal plane with said signals arriving along said vertical plane, means for measuring the difference between said horizontal plane signal and said vertical plane signal means for processing said signals generated by said electro-acoustic transducers to determine the correlation between the signal that arrives at one electro-acoustic transducer with the same signal that arrives at another electro-acoustic transducer, and means for displaying said processed signals.

5. An underwater sound detection apparatus comprising a first plurality of electro-acoustic transducers arranged in a rectangular ordered array defining a generally planar elongated shape having longitudinal axis, a second plurality of electro-acoustic transducers arranged in a rectangular ordered array defining a generally planar elongated shape having a second longitudinal axis, said first and second plurality of electro-acoustic transducer arrays and said first and second longitudinal axes being generally disposed parallel to each other, with said electro-acoustic transducers of said first and second arrays aligned with each other and equally spaced from each other so that the spacing between adjacent electro-acoustic transducers is fixed and equal in all rectangular coordinate directions, a third plurality of electro-acoustic transducers arranged in rectangular ordered array defining a generally planar elongated shape having a third longitudinal axis, a fourth plurality of electro-acoustic transducers arranged in an ordered array defining a generally planar elongated shape having a fourth longitudinal axis, said third and fourth plurality of electro-acoustic transducer rectangular arrays and said third and fourth longitudinal axes being generally disposed parallel to each other, with said electro-acoustic transducers of said third and fourth arrays aligned with each other and equally spaced from each other so that the spacing between adjacent electro-acoustic transducers is fixed and equal in all rectangular coordinate directions, said first and second pluralities of electro-acoustic transducers being parallel to and in the same plane as said third and fourth pluralities of electro-acoustic transducers and fixed in position relative thereto, said first and second longitudinal axes being perpendicular to said third and fourth longitudinal axes, means electrically connected to said electro-acoustic transducers for detecting electrical signals generated by said electro-acoustic transducers by said pressure waves impinging thereon, and means for processing said electrical signals generated by said electro-acoustic transducers.

6. The underwater sound detection apparatus as claimed in claim 5 wherein said means form processing said electrical signals generated by said electro-acoustic transducers comprises means for processing said signals generated by said electro-acoustic transducers to determine the correlation between the signal that arrives at one electro-acoustic transducer with the same signal that arrives at another electro-acoustic transducer.

7. The underwater sound detection apparatus as claimed in claim 5 wherein said means electrically connected to said electro-acoustic transducers for detecting electrical signals generated by said electro-acoustic transducers from acoustic pressure waves impinging thereon comprises a hydrophone controller comprising means for measuring magnitude of the output signal from said electro-acoustic transducer, means for storing said measured magnitude of output signal, means for transmitting said stored measurement to said means for processing said signals generated by said electro-acoustic transducers to determine the correlation between the signal that arrives at one electro-acoustic transducer with the same signal that arrives at another electro-acoustic transducer.

8. The underwater sound detection apparatus as claimed in claim 5 further comprising means for defining an array aperture adapted to receive incoming pressure wave signals only from a particular angle, means for rotating said aperture, means for generating a polar coordinate signal display, means for synchronizing said means for rotating said aperture with said polar coordinate display.

9. The underwater sound detection apparatus as claimed in claim 5 further comprising means for defining an array receiving aperture lobe to receive incoming pressure wave signals for a predetermined solid angular range, said predetermined solid angular range having a maximum vertical arc range in which the maximum upward vertical angle is defined by the angle at which the surface reverberation noise is reduced to a level less than the ocean ambient noise level, and the maximum vertical downward angle is defined by the angle at which the bottom reverberation noise is reduced to a level less than the ocean ambient noise level, and a maximum horizontal arc range of 360 degrees of horizontal arc.

10. The underwater sound detection apparatus comprising a first plurality of electro-acoustic transducers arranged in a rectangular ordered array defining a generally planar elongated shape having a first longitudinal axis, a second plurality of electro-acoustic transducers arranged in a rectangular ordered array, defining a generally planar elongated shape having a second longitudinal axis, said first and second plurality of electro-acoustic transducer arrays and said first and second longitudinal axes being generally disposed parallel to each other, with said electro-acoustic transducers of said first and second arrays aligned with each other and equally spaced from each other so that the spacing between adjacent electro-acoustic transducers is fixed and equal in all rectangular coordinate directions, a third plurality of electro-acoustic transducers arranged in a rectangular ordered array defining a generally planar elongated shape having a third longitudinal axis, a fourth plurality of electro-acoustic transducers arranged in an ordered array defining a generally planar elongated shape having a fourth longitudinal axis, said third and fourth plurality of electro-acoustic transducer rectangular arrays and said third and fourth longitudinal axes being generally disposed parallel to each other, with said electro-acoustic transducers of said third and fourth arrays aligned with each other and equally spaced from each other so that the spacing between adjacent electro-acoustic transducers is fixed and equal in all rectangular coordinates directions, said first and second pluralities of electro-acoustic transducers being parallel to and in the same plane as said third and fourth pluralities of electro-acoustic transducers and fixed in position relative thereto, said first and second longitudinal axes being perpendicular to said third and fourth longitudinal axes, means electrically connected to said electro-acoustic transducers for determining electrical signals generated by said electro-acoustic transducers by said pressure waves impinging thereon, and means for measuring pressure wave signals arriving at said array along a horizontal plane, means for measuring pressure wave signals arriving at said array along a vertical plane, means for comparing said signals arriving along a said horizontal plane with said signals arriving along said vertical plane, means for measuring the difference between said horizontal plane signal and said vertical plane signal, means for displaying said resulting difference signal.

11. An underwater sound detection apparatus comprising a first plurality of electro-acoustic transducers arranged in a rectangular ordered array defining a generally planar elongated shape having a first longitudinal axis, a second plurality of electro-acoustic transducers arranged in a rectangular ordered array defining a generally planar elongated shape having a second longitudinal axis, said first and second plurality of electro-acoustic transducer arrays and said first and second longitudinal axes being generally disposed parallel to each other, with said electro-acoustic transducers of said first and second arrays aligned with each other and equally spaced from each other so that the spacing between adjacent electro-acoustic transducers is fixed and equal in all rectangular coordinate directions a third plurality of electro-acoustic transducers arranged in an ordered array defining a generally planar elongated shape having a third longitudinal axis, a fourth plurality of electro-acoustic transducers arranged in an ordered array defining a generally planar elongated shape having a fourth longitudinal axis, said third and fourth plurality of electro-acoustic transducer arrays and said third and fourth longitudinal axes being generally disposed parallel to each other, with said electro-acoustic transducers of said third and fourth arrays aligned with each other and equally spaced from each other so that the spacing between adjacent electro-acoustic transducers is fixed and equal in all rectangular coordinate directions, said first and second pluralities of electro-acoustic transducers being parallel to said third and fourth pluralities of electro-acoustic transducers and fixed in position relative thereto, said first and second longitudinal axes being perpendicular to said third and fourth longitudinal axes, means electrically connected to said electro-acoustic transducers for detecting electrical signal generated by said electro-acoustic transducers by said pressure waves impinging thereon, means for processing said electrical signals generated by said electro-acoustic transducers comprising means for measuring pressure wave signals arriving at said array along a horizontal plane, means for measuring pressure wave signals arriving at said array along a vertical plane, means for comparing said signals arriving along a said horizontal plane with said signals arriving along said vertical means for measuring the difference between said horizontal plane signal and said vertical plane signal, means for displaying said resulting difference signal.

12. The underwater sound detection apparatus as claimed in claim 11 further comprising a plurality of means, corresponding to said plurality of electro-acoustic transducers, for generating a pulse of electrical energy having a predetermined frequency and duration, means for connecting each of said corresponding means for generating a pulse of electrical energy to a corresponding electro-acoustic transducer, means for activating said plurality of means for generating a pulse of electrical energy to produce a sound pressure wave pulse by said plurality of electro-acoustic transducers to produce a modulated sound pressure wave beam having a predetermined vertical and horizontal solid angle, said predetermined vertical and horizontal solid angle having a maximum vertical arc range in which the maximum upward vertical angle is defined by the angle at which the generated sound signals ambient sound level, and the maximum vertical downward angle is defined by the angle at which the generated sound signals reflected back from the ocean bottom are less than the ocean ambient sound level, and a maximum horizontal arc range of 360 degrees of horizontal arc, and a predetermined bearing and azimuth propagating in at least one direction away from said array, said bearing ranging up to 360 degrees in the horizontal plane and said azimuth ranging between a maximum upward vertical angle is defined by the angle at which the generated sound signals reflected back from the ocean surface are less than the ocean ambient sound level, and the maximum vertical downward angle is defined by the angle at which the generated sound signals reflected back from the ocean bottom are less than the ocean ambient sound level.

13. The underwater sound detection apparatus as claimed in claim 10 further comprising
a plurality of means, corresponding to said plurality of electro-acoustic transducers, for generating a pulse of electrical energy having a predetermined frequency and duration,
means for connecting each of said corresponding means for generating a pulse of electrical energy to a corresponding electro-acoustic transducer,
means for activating said plurality of means for generating a pulse of electrical energy to produce a sound pressure wave pulse by said plurality of electro-acoustic transducers to produce a modulated sound pressure wave beam having a predetermined vertical and horizontal solid angle, said predetermined solid angle having a maximum vertical arc range in which the maximum upward vertical angle is defined by the angle at which the generated sound signals reflected back from the ocean surface are less than the ocean ambient sound level, and the maximum vertical downward angle is defined by the angle at which the generated sound signals reflected back from the ocean bottom are less than the ocean ambient sound level, and a maximum horizontal arc range of 360 degrees of horizontal arc and predetermined bearing and azimuth propagating in at least one direction away from said array.

14. The underwater sound detection apparatus as claimed in claim 11 further comprising
a plurality of means, corresponding to said plurality of electro-acoustic transducers, for generating a pulse of electrical energy having a predetermined frequency and duration,
means for connecting each of said corresponding means for generating a pulse of electrical energy to a corresponding electro-acoustic transducer,
means for activating said plurality of means for generating a pulse of electrical energy to produce a sound pressure wave pulse by said plurality of electro-acoustic transducers to produce a modulated sound pressure wave beam having a predetermined vertical and horizontal solid angle, said predetermined horizontal and vertical solid angle having a maximum vertical arc range in which the maximum upward vertical angle is defined by the angle at which the generated sound signals reflected back from the ocean surface are less than the ocean ambient sound level, and the maximum vertical downward angle is defined by the angle at which the generated sound signals reflected back from the ocean bottom are less than the ocean ambient sound level, and a maximum horizontal arc range of 360 degrees of horizontal arc, and predetermined bearing and azimuth propagating in at least one direction away from said array.

15. An underwater sound detection apparatus comprising
a plurality of omni-directional electro-acoustic transducers arranged in a generally rectangular three-dimensional array comprising at least two parallel planes of electro-acoustic transducers,
means for activating said electro-acoustic transducers to produce a sound pulse pressure wave having a predetermined frequency and duration,
means for timing the generation of said sound pulse pressure wave by said individual electro-acoustic transducers to produce a modulated frequency pressure wave signal in a single predetermined direction and solid angle propagating away from said array, said solid angle having a maximum vertical arc range in which the maximum upward vertical angle is defined by the angle at which the generated sound signals reflected back from the ocean surface are less, than the ocean ambient sound level, and the maximum vertical downward angle is defined by the angle at which the generated sound signals deflected back from the ocean bottom are less than the ocean ambient sound level, and a maximum horizontal arc range of 360 degrees of horizontal arc,
means for switching said plurality of omni-directional electro-acoustic transducers from active to passive mode and from passive to active mode,
means for detecting incoming sound pressure wave signals impinging upon said electro-acoustic transducers while in the passive mode from a single predetermined direction and solid angle, said predetermined solid angle having a maximum vertical arc range in which the maximum upward vertical angle is defined by the angle at which the surface reverberation noise is reduced to a level less than the ocean ambient noise level, and the maximum bottom reverberation noise is reduced to a level less than the ocean ambient noise level, and a maximum horizontal arc range of 360 degrees of horizontal arc, and
means for processing said incoming signal received and time delay for reflection of said modulated frequency pressure wave pulse previously generated by said electro-acoustic transducer.

16. An underwater sound detection apparatus comprising
a plurality of omni-directional electro-acoustic transducers arranged in a generally rectangular three-dimensional array comprising at least two parallel planes of electro-acoustic transducers,
means for activating said electro-acoustic transducers to produce a modulated sound pressure wave having a predetermined duration and frequency,
means for shaping said modulated sound pressure to define a sound pressure wave having a predetermined vertical and horizontal solid angle, said predetermined vertical and horizontal solid angle having a maximum vertical arc range in which the maximum upward vertical angle is defined by the angle at which the generated sound signals reflected back from the ocean surface are less than the ocean ambient sound level, and the maximum vertical downward angle is defined by the angle at which the generated sound signals reflected back from the ocean bottom are less than the ocean ambient sound level, and a maximum horizontal arc range of 360 degrees of horizontal arc, means for causing said sound pressure wave to propagate away from said array in at least one direction at a predetermined bearing and azimuth, means for detecting modulate sound pressure waves passing through said array and impinging upon said electro-acoustic transducers within a predetermined vertical and horizontal solid angle, said predetermined vertical and horizontal solid angle having a maximum vertical arc range in which the maximum upward vertical angle is defined by the angle at which the surface reverberation noise is reduced to a level less than the ocean ambient noise level, and the maximum vertical downward angle is defined by the angle at which the bottom reverberation noise is reduced to a level less than the ocean ambient noise level, and a maximum horizontal arc range of 360 degrees of horizontal arc, and means for determining the bearing and azimuth of said sound pressure waves passing through said array and impinging upon said electro-acoustic transducers within a predetermined vertical and horizontal solid angle, said predetermined vertical and horizontal solid angle having a maximum vertical arc range in which the maximum upward vertical angle is defined by the angle at which the surface reverberation noise is reduced to a level less than the ocean ambient noise level, and the maximum vertical downward angle is defined by the angle at which the bottom reverberation noise is reduced to a level less than the ocean ambient noise level, and a maximum horizontal arc range of 360 degrees of horizontal arc.

17. An underwater sound detection apparatus comprising a first plurality of electro-acoustic transducers arranged in an ordered array defining a generally planar elongated shape having a first longitudinal axis, a second plurality of electro-acoustic transducers arranged in an ordered array defining a generally planar elongated shape having a second longitudinal axis, said first and second plurality of electro-acoustic transducers arrays and said first and second plurality longitudinal axes being generally disposed parallel to each other, with said electro-acoustic transducers of said first and second arrays aligned with each other and equally spaced from each other so that the spacing between adjacent electro-acoustic transducers is fixed and equal in all rectangular coordinate directions a third plurality of electro-acoustic transducers arranged in a rectangular ordered array defining a generally planar elongated shape having a third longitudinal axis, a fourth plurality of electro-acoustic transducers arranged in a rectangular ordered array defining a generally planar elongated shape having a fourth longitudinal axis, said third and fourth plurality of electro-acoustic transducer arrays and said third and fourth longitudinal axes being generally disposed parallel to each other, with said electro-acoustic transducers of said third and fourth arrays aligned with each other and equally spaced from each other so that the spacing between adjacent electro-acoustic transducers is fixed and equal in all rectangular coordinate directions said first and second pluralities of electro-acoustic transducers being parallel to and in the same plane as said third and fourth pluralities of electro-acoustic transducers and fixed in position relative thereto, said first and second longitudinal axes being perpendicular to said third and fourth longitudinal axes, means for activating said electro-acoustic transducers to produce a modulated sound pressure wave having a predetermined duration and frequency, means for shaping said modulated sound pressure wave to define a sound pressure wave having a predetermined vertical and horizontal solid angle, said predetermined vertical and horizontal solid angle having a maximum vertical arc range in which the maximum upward vertical angle is defined by the angle at which the generated sound signals reflected back from the ocean surface are less than the ocean ambient sound level, and the maximum vertical downward angle is defined by the angle at which the generated sound signals reflected back from the ocean bottom are less than the ocean ambient sound level, and a maximum horizontal arc range of 360 degrees of horizontal arc, means for causing said sound pressure wave to propagate away from said array in at least one direction at a predetermined bearing and azimuth, means for detecting modulated sound pressure waves passing through said array and impinging upon said electro-acoustic transducers within a predetermined vertical and horizontal solid angle, said predetermined vertical and horizontal solid angle having a maximum vertical arc range in which the maximum upward vertical angle is defined by the angle at which the surface reverberation noise is reduced to a level less than the ocean ambient noise level, and the maximum vertical downward angle is defined by the angle at which the bottom reverberation noise is reduced to a level less than the ocean ambient noise level, and a maximum horizontal arc range of 360 degrees of horizontal arc, and means for determining the bearing and azimuth of said second pressure waves passing through said array and impinging upon said electro-acoustic transducers within a predetermined vertical and horizontal solid angle, said predetermined vertical and horizontal solid angle having a maximum vertical arc range in which the maximum upward vertical angle is defined by the angle at which the surface reverberation noise is reduced to a level less than the ocean ambient noise level, and the maximum vertical downward angle is defined by the angle at which the bottom reverberation noise is reduced to a level less than the ocean ambient noise level, and a maximum horizontal arc range of 360 degrees of horizontal arc.

18. An underwater sound detection apparatus comprising a first display of electro-acoustic transducers arranged in a rectangular ordered array defining a generally planar elongated shape having a first longitudinal axis, a second plurality of electro-acoustic transducers arranged in a rectangular ordered array defining a generally planar elongated shape having a second longitudinal axis, said first and second plurality of electro-acoustic transducers and said first and second longitudinal axes being disposed parallel to each other, with said electro-acoustic transducers of said first and second arrays aligned with each other and equally spaced from each other so that the spacing between adjacent electro-acoustic transducers is fixed and equal in all rectangular coordinate directions, a third plurality of electro-acoustic transducers arranged in rectangular ordered array defining a generally planar elongated shape having a third longitudinal axis, a fourth plurality of electro-acoustic transducers arranged in a rectangular ordered array defining a generally planar elongated shape having a fourth longitudinal axis, said third and fourth plurality of electro-acoustic transducer arrays and said third and fourth longitudinal axes being disposed parallel to each other, with said electro-acoustic transducers of said third and fourth arrays aligned with each other and equally spaced from each other so that the spacing between adjacent electro-acoustic transducers is fixed and equal in all rectangular coordinate directions, said first and second pluralities of electro-acoustic transducers being parallel to and in the same plane as said third and fourth pluralities of electro-acoustic transducers and fixed in position relative thereto, said first and second longitudinal axes being perpendicular to said third and fourth longitudinal axes, means for activating said electro-acoustic transducers to produce a modulated sound pressure wave having a predetermined duration and frequency, means for shaping said modulated sound pressure wave to define a sound pressure wave having a predetermined vertical and horizontal solid angle, said predetermined vertical and horizontal solid angle having a maximum vertical arc range in which the maximum upward vertical angle is defined by the angle at which the generated sound signals reflected back from the ocean surface are less than the ocean ambient sound level, and the maximum vertical downward angle is defined by the angle at which the generated sound signals reflected back from the ocean bottom are less than the ocean ambient sound level, and a maximum horizontal arc range of 360 degrees of horizontal arc, means for causing said sound pressure wave to propagate away from said array in at least one direction at a predetermined bearing and azimuth, means for detecting modulated sound pressure waves passing through said array and impinging upon said electro-acoustic transducers within a predetermined vertical and horizontal solid angle, said predetermined vertical and horizontal solid angle having a maximum vertical arc range in which the maximum upward vertical angle is defined by the angle at which the surface reverberation noise is reduced to a level less than the ocean ambient noise level, and the maximum vertical downward angle is defined by the angle at which the bottom reverberation noise is reduced to a level less than the ocean ambient noise level, and a maximum horizontal arc range of 360 degrees of horizontal arc, and means for determining the bearing and azimuth of said sound pressure waves passing through said array and impinging upon said electro-acoustic transducers within a predetermined vertical and horizontal solid angle, said predetermined vertical and horizontal solid angle having a maximum vertical arc range in which the maximum upward vertical angle is defined by the angle at which the surface reverberation noise is reduced to a level less than the ocean ambient noise level, and the maximum vertical downward angle is defined by the angle at which the bottom reverberation noise is reduced to a level less than the ocean ambient noise level, and a maximum horizontal arc range of 360 degrees of horizontal arc.

19. An underwater sound detection apparatus comprising a first plurality of electro-acoustic transducers arranged in a rectangular ordered array defining a generally planar elongated shape having a vertical longitudinal axis, a second plurality of electro-acoustic transducers arranged in a rectangular ordered array defining a generally planar elongated shape having a horizontal longitudinal axis, the plane of said first plurality of electro-acoustic transducers being aligned and parallel with the plane of said second plurality of electro-acoustic transducers and fixed in position relative thereto, with said electro-acoustic transducers of said first and second aligned with each other and said electro-acoustic transducers within each array equally spaced from each other so that the spacing between adjacent electro-acoustic transducers is equal in all rectangular coordinate directions, means electrically connected to said second plurality of electro-acoustic transducers for detecting electrical signals generated by said first plurality of electro-acoustic transducers by said pressure waves impinging thereon, and means for processing said electrical signals generated by said electro-acoustic transducers.

20. The underwater sound detection apparatus as claimed in claim 19 wherein said means for processing said electrical signals generated by said electro-acoustic transducers comprises means for processing said signals generated by said electro-acoustic transducers to determine the correlation between the signal that arrives at one electro-acoustic transducer with the same signal that arrives at another electro-acoustic transducer.

21. The underwater sound detection apparatus as claimed in claim 20 wherein said means for processing said signals generated by said electro-acoustic transducers to determine the correlation between the signal that arrives at one electro-acoustic transducer when the same signal that arrives at another electro-acoustic transducer comprises means for measuring time delay of the signal detected by said electro-acoustic transducers between individual electro-acoustic transducers, means for determining the correlation between the signal that arrives at one electro-acoustic transducer with the same signal that arrives at another electro-acoustic transducer, means for displaying said correlation.

22. The underwater sound detection apparatus as claimed in claim 19 wherein said means electrically connected to said electro-acoustic transducers for detecting electrical signals generated by said electro-acoustic transducer from acoustic pressure waves impinging thereon comprises a hydrophone controller comprising means for measuring magnitude of the output signal from said electric-acoustic transducer, means for storing said ensured magnitude of output signal, means for transmitting said stored measurement to said means for processing said signals generated by said electro-acoustic transducers to determine the correlation between the signal that arrives at one electro-acoustic transducer with the same signal that arrives at another electro-acoustic transducer.

23. The underwater sound detection apparatus as claimed in claim 19 further comprising a plurality of means, corresponding to said first plurality of electro-acoustic transducers, for generating a pulse of electrical energy having a predetermined frequency and duration, means for connecting each of said corresponding means for generating a pulse of electrical energy to a corresponding electro-acoustic transducer of said first plurality of electro-acoustic transducers, means for activating said plurality of means for generating a pulse of electrical energy to produce a sound pressure wave pulse by said first plurality of electro-acoustic transducers to provide a modulated sound pressure wave beam having a predetermined vertical solid angle, said predetermined vertical and horizontal solid angle having a maximum vertical arc range in which the maximum upward vertical angle is defined by the angle at which the generated sound signals reflected from the ocean surface are less than the ocean ambient sound level, and the maximum vertical downward angle is defined by the angle at which the generated sound signals ambient sound level, and a maximum horizontal arc range of 360 degrees of horizontal arc and propagating in a direction away from said array.

means for detecting incoming sound pressure wave signals impinging upon said second plurality of electro-acoustic transducers while in the passive mode from a predetermined direction and solid angle, and means for processing said incoming signal received by said second plurality of electro-acoustic transducers to determine frequency and time delay for reflection of said modulated frequency pressure wave pulse previously generated by said first plurality of electro-acoustic transducers.

* * * * *